US009636828B2

(12) United States Patent
Gosselin et al.

(10) Patent No.: US 9,636,828 B2
(45) Date of Patent: May 2, 2017

(54) ARTICULATED LIMB FOR A ROBOT OR HAPTIC INTERFACE AND ROBOT AND HAPTIC INTERFACE COMPRISING AT LEAST ONE SUCH ARTICULATED LIMB

(71) Applicant: Commissariat à l'énergie atomique et aux énergies alternatives, Paris (FR)

(72) Inventors: Florian Gosselin, Vanves (FR); Javier Martin, Saragossa (ES)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 462 days.

(21) Appl. No.: 14/367,471

(22) PCT Filed: Dec. 19, 2012

(86) PCT No.: PCT/EP2012/076152
§ 371 (c)(1),
(2) Date: Jun. 20, 2014

(87) PCT Pub. No.: WO2013/092714
PCT Pub. Date: Jun. 27, 2013

(65) Prior Publication Data
US 2014/0366675 A1 Dec. 18, 2014

(30) Foreign Application Priority Data

Dec. 20, 2011 (FR) ...................... 11 62047

(51) Int. Cl.
*B25J 17/00* (2006.01)
*E05D 1/00* (2006.01)
(52) U.S. Cl.
CPC ............... *B25J 17/00* (2013.01); *E05D 1/00* (2013.01); *Y10S 901/28* (2013.01); *Y10T 29/49826* (2015.01); *Y10T 74/20329* (2015.01)

(58) Field of Classification Search
CPC .. E05D 1/02; B25J 13/02; B25J 13/025; B25J 13/08; B25J 17/00; B25J 9/0015;
(Continued)

(56) References Cited

U.S. PATENT DOCUMENTS 4,932,806 A 6/1990 Eklund
5,945,053 A 8/1999 Hettinga
(Continued)

FOREIGN PATENT DOCUMENTS

DE 233 657 C 9/1910
DE 299 24 176 U1 4/2002
(Continued)

OTHER PUBLICATIONS

Paul Bernardoni et al., "Outils et methodes de conception de structures mecaniques a deformations reparties et actionnement discret" Universite Paris Oct. 6, 2004.
(Continued)

*Primary Examiner* — Daniel Wiley
(74) *Attorney, Agent, or Firm* — Pearne & Gordon LLP

(57) ABSTRACT

A jointed limb comprising at least first (2) and second (4) rigid segments and a joint (6) providing rotation of the first and second segments with respect to each other about an axis of rotation (Y), said joint (6) comprising fibers, wherein each of the segments (2, 4) comprises a body (8.1, 8.2) and an end element (10.1, 10.2) provided at an end of said body, both end elements (10.1, 10.2) being held facing each other by said joint (6), said end elements (10.1, 10.2) comprising tapered profiles having vertices facing each other, each of said end elements (10.1, 10.2) being made prior to being secured it to the corresponding body (8.1, 8.2).

20 Claims, 12 Drawing Sheets

(58) Field of Classification Search
CPC ......... Y10T 74/20305; Y10T 74/20329; Y10T 74/20323
See application file for complete search history.

(56) References Cited

U.S. PATENT DOCUMENTS

| | | |
|---|---|---|
| 8,672,332 B2 | 3/2014 | Kauper |
| 2009/0260473 A1 | 10/2009 | Gosselin |
| 2012/0234126 A1 | 9/2012 | Gosselin |
| 2013/0090194 A1 | 4/2013 | Ferlay |

FOREIGN PATENT DOCUMENTS

| | | |
|---|---|---|
| DE | 103 39 775 A1 | 3/2005 |
| DE | 10 2005 056400 A1 | 5/2007 |
| EP | 1 464 784 A1 | 10/2004 |
| FR | 2 775 927 A1 | 9/1999 |
| FR | 2 844 166 A1 | 3/2004 |
| JP | 2006 097357 A | 4/2006 |
| WO | 2008/015178 A1 | 2/2008 |

OTHER PUBLICATIONS

Markus Grebenstein et al., "Antagonistically Driven Finger Design for the Anthropomorphic DLR Hand Arm System" IEEE-RAS International Conference on Humanoid Robots, Dec. 6-8, 2010.

L. Biagiotti et al., "Innovative Design of Robot Hands for Space Activities" 8th ESA Workshop on Advanced Space and Technologies for Robotics and Automation, Nov. 2-4, 2004.

Wei Dong et al., "Stiffness Influence Atlases of a Novel Flexure Hinge-Based Parallel Mechanism with Large Workspace" IEEE/RSJ International Conference on Intelligent Robots and Systems, 2005.

Search Report issued in French Patent Application No. FR 11 62047 dated Dec. 10, 2012.

Tatsuo Arai et al., "Development of 3 DOF Micro Finger" IEEE/RSJ International Conference on Intelligent Robots and Systems, Nov. 1996.

Zhe Xu et al., "Design and Analysis of an Artificial Finger Joint for Anthropomorphic Robotic Hands" IEEE International Conference on Robotics and Automation, May 9-13, 2011.

International Search Report issued in Application No. PCT/EP2012/076152 dated May 23, 2013.

Written Opinion for Application No. PCT/EP2012/076152.

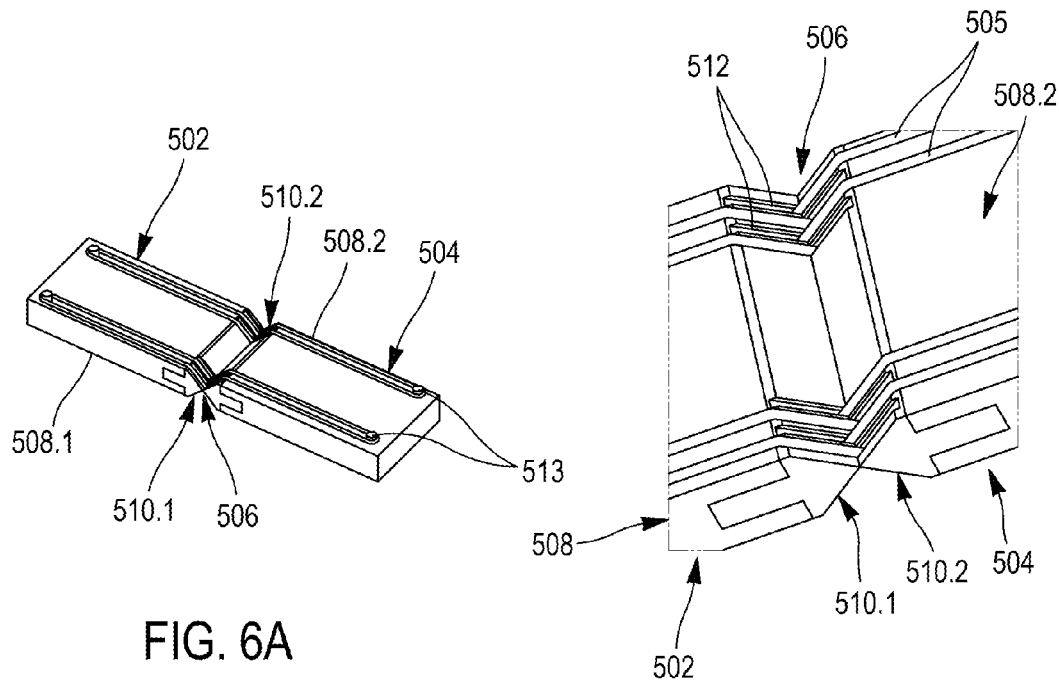
FIG. 6A
FIG. 6B
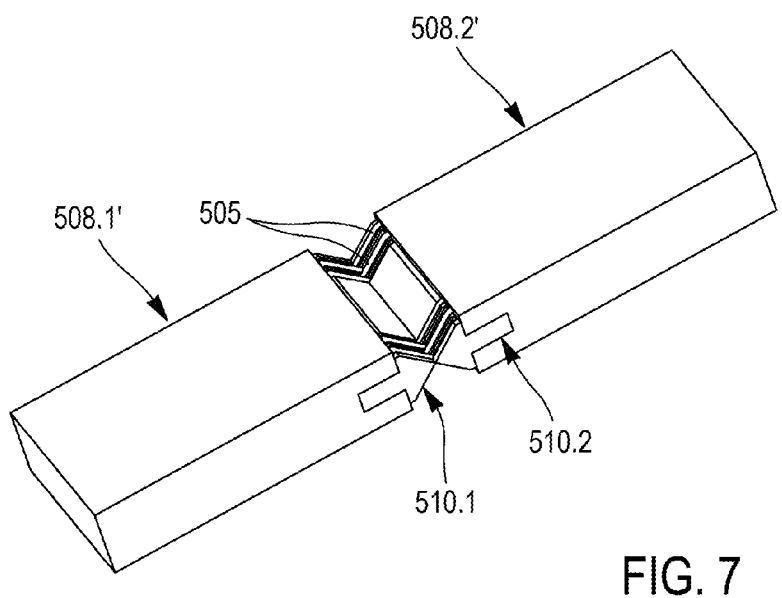
FIG. 7

ARTICULATED LIMB FOR A ROBOT OR HAPTIC INTERFACE AND ROBOT AND HAPTIC INTERFACE COMPRISING AT LEAST ONE SUCH ARTICULATED LIMB

TECHNICAL FIELD AND PRIOR ART

The present invention relates to a jointed limb for a robot or for a haptic interface and to robots and haptic interfaces implementing at least one such jointed limb.

Most known robots and haptic interfaces use a jointed kinematic chain consisting of several movable bodies connected to each other by joints connecting a fixed base to one or more effector(s) in the case of a manufacturing robot or to one or more gripper(s) gripped by the user in the case of a force feedback interface.

These poly-jointed chains enable the position and/or orientation of the terminal organ to be controlled with respect to the base.

Joints of most existing robots are made based on ball bearings or plain bearings. This solution enables the strain transmission performance to be optimized while minimising plays and friction. However, this type of joints implements numerous mechanical parts which require a close fit to ensure the good working order of the joint.

These joints are thus complex and expensive. Besides, they are generally heavy and bulky with respect to the robot size.

Other devices use joints wherein two segments come, as the human body bones, to roll and/or slide against each other in housings machined to that end. There can be mentioned the example of joint suggested in the paper X. Zhe, E. Todorov, B. Delion, Y. Matsuoka, '*Design and Analysis of an Artificial Finger Joint for Antrhopomorphic Robotic Hands*', Submitted to IEEE International Conference on Robotics and Automation, 2011, 9-13 May 2011, Shanghai, China. It is suggested in this document to recreate a joint having a behaviour close to that of the human metacarpophalangeal joint. It comprises a patella and elements simulating the ligaments.

A similar approach is used in the paper M. Grebenstein, M. Chalon, G. Hirzinger, R. Siegwart, '*Antagonistically Driven Finger Design for the Anthropomorphic DLR Hand Arm System*', Proceedings of the 2010 IEEE-RAS International Conference on Humanoid Robots, 6-8 Dec. 2010, Nashville, Tenn., USA, pp. 609-616.

In both cases, however, these solutions lead to a complex kinematics and not just a pivot. Besides, these joints should always remain tensioned and are thus subjected permanently to strains, which can reduce their lifetime. Finally, they are fragile and can be dislocated as human joints. In this case, the mechanism geometry is no longer ensured and it needs repairing to be used again.

Further, in the field of micro and meso technologies, both types of joints can hardly be implemented because of the size of devices made in that field. In order to circumvent manufacturing and assembling problems at a small scale, joints as a spring or of a locally thinned deformable material have been suggested. These joints are relatively easy to make, they represent consequently interesting solutions from the economic point of view and, further, they enable the defects of jointed structures to be avoided, in particular play and wear. However, the relative displacement of parts located on either side of this type of joint should remain small if the material forming the connection is to remain in its elastic range. Another defect of this solution is that the joint has a generally elastic resistance to movement, which reduces its yield.

There are also flexible cloth hinges to connect two rigid elements such as those described in document FR 2 775 927 and used in furniture. However, these hinges have a local brittleness which is incompatible with a use in a robot.

Other joints, used as container door hinges, have also been suggested in Document EP 1 464 784. In these joints, the thinned zone is formed by two layers of carbon fibres connected to each other on at least part of the hinge length. This joint is thick enough and of a relatively large length. As a result, the joint is not just a pivot and one of the jointed elements undergoes a combined translation and rotation movement. Moreover, this joint does not resist to parasitic strains, for example vertical strains.

Document WO 2008/015178 describes a jointed limb comprising two rigid segments and a joint, the joint being of a fibrous material attached in each of the rigid segments. Such a joint has practically no resistance. Moreover, if the segments are bevelled, they can be placed very close to each other. Under these conditions, the free length of the fibrous material is very short. Since the fibrous material is moreover very resistant in elongation, the parasitic movements are very restricted and the movement is of a high quality. The fibrous assembled for example as cables or cloths are clamped or moulded in the segments. This jointed limb is satisfactory. However, the segments require very accurate machinings, both locally and globally. Indeed, a great accuracy is locally required at the ends of both segments facing each other to make a profile improving the rotation behaviour. Besides, to make complex structures, for example a parallelogram type structure formed by four members jointed to each other, a great accuracy is also required in the overall dimensions of the different segments. This accuracy, both local and global, increases the structure cost. Further, since each segment is made as one piece, this implies the manufacture of numerous different parts.

DISCLOSURE OF THE INVENTION

Consequently, the purpose of the present invention is to provide a jointed limb provided with a joint enabling a great clearance while offering a high solidity, and only opposing a low resistance strain when the joint moves, and the design of which allows a great manufacturing accuracy while having a reduced manufacturing cost.

The previously stated purpose is achieved by virtue of a jointed limb comprising two rigid elements and a joint formed of a fibrous material connecting ends of the rigid elements and the free length of which between these elements is small, each rigid element comprising at least two parts, a first part or insert forming the end connected to the other rigid element through the joint and a second part forming the body of the rigid element.

Thus, the first part requiring a great accuracy can be made first, the same being then secured to the body of the rigid element which generally requires a lesser accuracy.

Thanks to the invention, the first parts of all the rigid elements can be mass produced and mounted on bodies adapted to the application but the manufacture of which is less expensive. The fibrous material only offers a very small resistance to movements, a great solidity, in particular in the direction of the fibres. Besides, it is easy to manufacture and easy to assemble with the segments of the member to be made.

In other words, the member comprises three sets: a fibrous material a very small length of which is let free so as to make a very accurate and very transparent pivot connection, two rigid elements desired to be made rotatably movable with respect to each other and two inserts provided at the end of the rigid elements and advantageously contacting upon assembling. The function of the inserts is to guide the fibrous material of the joint and ensure contact between the segments. The bodies of the rigid elements place the inserts into the space and only require some accurate dimensions, mainly the gap between the planes receiving the rear part of the inserts. The other dimensions do not need accurate tolerances and these parts can thus be made at a lesser cost, even if they are all different.

Particularly advantageously, the inserts are made of hard material, which enables frictional wear between the first two parts to be reduced and a good mechanical strength to be achieved. For example, the inserts can be made of steel whereas the bodies can be made by moulding a light material such as a plastic material or aluminium, which finally enables a relatively light structure to be preserved.

Also very advantageously, the inserts comprise transverse guide means for the fibrous part, for example formed by grooves in the case of cables, which avoids any movement along the axis of rotation of the joint. The manufacture of such grooves requires a great accuracy. However, thanks to the invention, these are formed in the inserts which are already made with a great accuracy. The present invention is thus particularly adapted to the implementation of such guide means.

Thus, the subject-matter of the present invention is a jointed limb comprising at least first and second rigid segments and a joint providing rotation of the first and second segments with respect to each other about an axis of rotation, said joint comprising fibres, wherein each of the segments comprises a body and an element provided at an end of said body, referred to as "end element", both end elements being held facing each other by said joint, said end elements comprising tapered profiles having vertices facing each other, each of said end elements being made prior to being secured to the corresponding body.

Preferably, the vertices have a rounded profile.

The joint is advantageously formed by at least two elongated elements extending, in a reference configuration, along a direction perpendicular to the joint axis between the first and second segments. The elongated elements can be formed by cables and/or by strips of woven or non-woven fibres.

In an exemplary embodiment, the joint is formed by a strip of woven or non-woven fibres the medium plane of which passes through or in proximity to the rotation, axis and extending, in a reference configuration, along a direction perpendicular to the axis of the joint between the first and second segments, said strip comprising edges separated by a distance in the direction of the axis of the joint close to the dimensions of the end elements in this direction.

In another exemplary embodiment, the joint is formed by several strips of woven or non-woven fibres the medium plane of which passes through or in proximity to the rotation axis and extending, in a reference configuration, along a direction perpendicular to the axis of the joint between the first and second segments, said strips comprising at least a first and a second strips, these said first and second strips being provided at the external ends of the joint in the direction of the axis of the joint, the external edges of said first and second external strips being separated by a distance in the direction of the axis of the joint close to the dimensions of the end elements in this direction.

According to one embodiment, the strip(s) or elongated elements pass through each end element at a plane of each of said end elements passing through their vertex, said plane comprising, in a reference configuration, the axis of rotation.

For example, at least one of the end elements is separated into two parts, said strip(s) or said elongated elements being received between said two parts. The end elements separated into two parts can then comprise means for securing both parts one against the other.

According to another embodiment, each end element is made in a part pierced to let the strip(s) or elongated elements pass, the hole having a shape adapted to the strip(s) or elongated elements.

The rounded profile of the vertex of each end element can be symmetrical, in a reference configuration, with respect to the plane containing the strip(s) or elongated element(s) and passing through said end element. Alternatively, the rounded profile of the vertex of each end element can be distributed between both parts of each of the end elements, the profile of each of the end elements obtained after placing said two parts being continuous. Or, the profile of the rounded vertex of each end element can be carried by a single one of both parts of each of the end elements, the profile of each of the end elements obtained after placing said two parts being continuous.

According to another exemplary embodiment, the elongated elements run on external faces of the end elements, said faces defining the tapered profile and meeting at the vertex, said elongated elements intersecting at the axis of rotation.

According to another exemplary embodiment, first elongated elements run on external faces of the end elements, said faces defining the tapered profile and meeting at the vertex, said first elongated elements intersecting at the axis of rotation, and wherein second elongated elements pass through the end elements at a plane of said end elements passing through their vertex, said plane intersecting, in a reference configuration, the axis of rotation.

The elongated elements can be cables and/or strips of woven or non-woven fibres.

The bodies can comprise two parts between which the end elements are held. Alternatively, the bodies can be moulded on the end elements.

Advantageously, the jointed limb comprises means preventing the strip(s) or elongated elements from being displaced along the axis of rotation. For example, the means preventing the strip(s) or elongated elements from being displaced along the axis of rotation comprise grooves extending perpendicular to the axis of rotation, which are formed on at least one of the faces facing the parts forming each end element.

The grooves can be formed in both faces of parts facing and opposite each other such as to form channels for the strip(s) or elongated elements. Alternatively, the grooves can be formed on the face of only one of the parts of each end element so as to form channels for the strip(s) or elongated elements, the other part facing each end element being smooth.

The depth of the channels is advantageously lower than the thickness of the strip(s) or elongated elements so as to slightly crush them.

According to another exemplary embodiment wherein the elongated element or the strip(s) run on the external faces of the end elements, the means preventing the strip(s) or elongated elements from being displaced along the axis of rotation can comprise grooves formed at least on one of the external faces of the end elements, said grooves extending perpendicular to the axis of rotation.

In another exemplary embodiment, the means preventing the strip(s) or elongated elements from being displaced along the axis of rotation comprise grooves formed in the vertex of at least one end element.

In another exemplary embodiment, the means preventing the strip(s) or elongated elements from being displaced along the axis of rotation comprise grooves extending perpendicular to the axis of rotation which are formed on at least one of the faces facing the parts forming each end element and/or grooves formed on at least one of the external faces of the end elements, said grooves extending perpendicular to the axis of rotation and/or grooves formed in the vertex of at least one end element.

In another exemplary embodiment, the means preventing the strip(s) or elongated elements from being displaced along the axis of rotation comprise a pair of flanges carried by one of the segments and providing a space the transverse dimension of which is able to receive the proximal part of the other segment and prevent it from being displaced along the axis of rotation.

The length of the strip(s) or elongated elements can be selected such that their ends protrude perpendicular to the axis of rotation of the ends of the bodies located opposite the end elements, enabling a tensile strain to be exerted on the same.

The jointed limb according to the invention can advantageously comprise means for exerting a tensile strain on the strip(s) or elongated elements.

Another subject-matter of the present invention is also a jointed limb according to the present invention comprising at least a first and a second elongated element, the first elongated element being located in proximity to first side edges of the end elements and the second elongated element being located in proximity to the second opposite side edges.

The joint can comprise two pairs of two cables, each pair being located in proximity to the side edges of the end elements.

For example, the end elements are of hard material such as steel. Advantageously, the bodies are of light material, such as aluminium or a plastic material.

In an exemplary embodiment, the main elongation direction of the first segment is, in a reference configuration, at an angle with the main elongation direction of the second segment.

The jointed limb can comprise at least one measuring element a part of which is attached to the first rigid segment and another part of which is attached to the second rigid segment. Very advantageously, the measuring element comprises a first part on the first segment and a second part on the second segment, the first and second parts being not mechanically connected to each other.

Another subject-matter of the present invention is also a jointed mechanism comprising n jointed limbs according to the invention, n being a positive integer equal to or higher than 2. In an exemplary embodiment, n–1 segments of the mechanism are common to at least two jointed limbs. In another example, all the segments are common to at least two jointed limbs.

The mechanism can comprise an actuating device for displacing a segment with respect to the other. For example, the actuating device comprises a rotating or linear actuator provided with a measuring means such as an angular or linear position sensor. The actuating device can comprise at least one electric motor and a reducer or is a hydraulic or pneumatic actuator.

Another subject-matter of the present invention is also a haptic interface comprising at least one jointed limb according to the present invention.

Another subject-matter of the present invention is also a robot comprising at least one jointed limb according to the present invention.

Another subject-matter of the present invention is also a force feedback glove comprising at least one robot according to the present invention for interacting with a finger.

Another subject-matter of the present invention is also a method for manufacturing a jointed limb, comprising the following steps:

a) manufacturing two end elements,
b) placing the elongated elements into and/or around the end elements,
c) contacting the end elements through their vertex,
d) tensioning the elongated elements,
e) assembling with the body.

In an exemplary embodiment, step e) occurs between step b) and step c).

In another exemplary embodiment, step e) occurs after step d) and step e) is a step of moulding the bodies on the end elements and on the elongated elements.

Advantageously, the end elements are made by machining.

BRIEF DESCRIPTION OF THE DRAWINGS

The present invention will be better understood using the description that follows and the appended drawings, wherein:

FIGS. 6A and 6B are respectively overall and detailed perspective views of an exemplary member according to a second embodiment, wherein the joint is made using cables, FIG. 7 is a perspective view of an alternative of the jointed limb of FIGS. 6A and 6B, FIGS. 8A and 8B are top and bottom perspective views of another alternative embodiment of the jointed limb of FIGS. 6A and 6B.

DETAILED DISCLOSURE OF PARTICULAR EMBODIMENTS

Throughout the description, the same references will be used to designate the elements carrying out the same function and having substantially the same shape.

The terms "horizontal", "vertical", "under", ... will not be restricting since the devices described can be provided according to any orientation in space.

The longitudinal end of the segments and facing inserts will be designated "proximal ends" and the opposite longitudinal ends of the segments and inserts will be designated "distal ends".

Figure 1A:
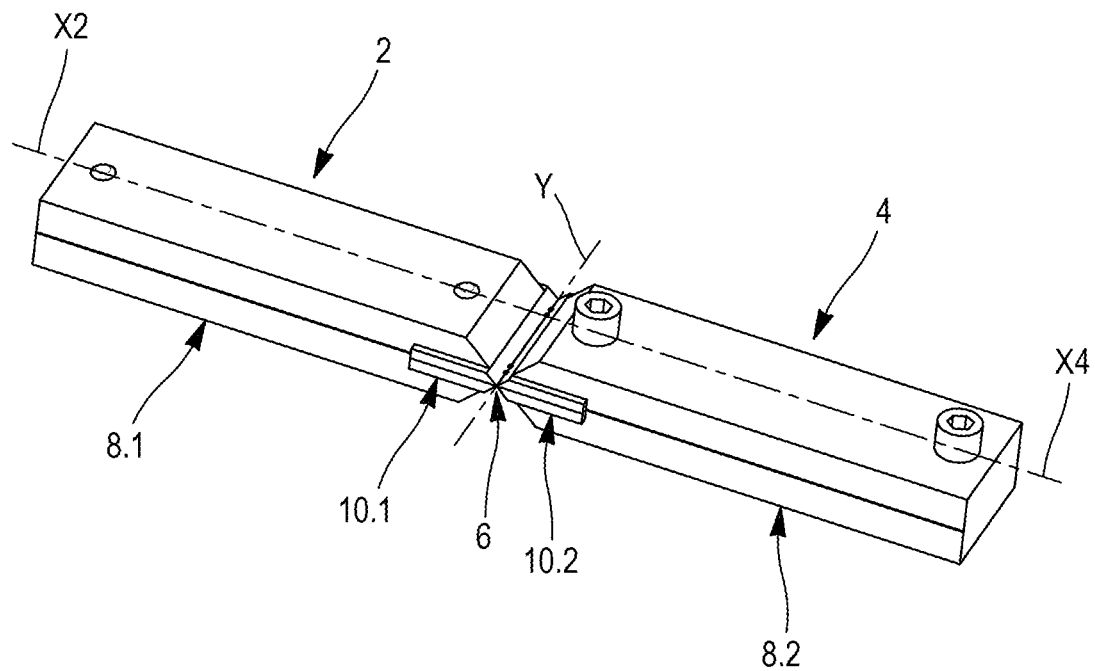
FIG. 1A is a perspective view of a first exemplary embodiment of a jointed limb according to the present invention, wherein the joint is made using cables.

In FIG. 1a, a first exemplary embodiment of the jointed limb can be seen, comprising a first segment 2 and a second segment 4 which are both rigid, extending mainly respectively along the axes X2 and X4 and a joint 6 connecting both segments 2, 4. Both segments are then jointed to each other by a pivot connection or a connection that can be assimilated to a pivot connection having an axis Y perpendicular to the axes X2 and X4. For the sake of simplification, the axis Y will be here considered as fixed or practically fixed with respect to the segments 2 and 4 even if the position of this axis with respect to these segments may slightly vary during the movement in some cases and depending on the geometry of the proximal ends of the segments and of the inserts and/or because of light parasitic movements of the joint. The axis Y extends along a transverse direction and the axes X2 and X4 extend along a longitudinal direction. In FIG. 1A, the device is represented in a reference configuration wherein the axes X2 and X4 are aligned. Of course, when the joint is moved about the axis Y, the axes X2 and X4 do not remain parallel.

The joint 6 is formed, in the example represented, by four filaments of cables provided by pairs on either side of the axes X2 and X4. The filaments advantageously extend in parallel to the axis X2 in the segment 2 and in parallel to the axis X4 in the segment 4. They can be held for example by clamping as illustrated in FIG. 1A either at their ends in the rigid segments 2, 4 or inside these segments, such that their free length between these segments remains small and does not vary much during movements about the axis Y.

According to the present application, a cable is formed by an assembly of metal wires or comprised of woven or non-woven natural or synthetic fibres having a main elongation direction much higher than its transverse dimensions. A cable can be formed by an assembly of strands, the strands can themselves be wound about a web. Its cross-section can be for example in a non-limiting way round or elliptic.

The cables can be made of steel, aramid, Kevlar®, Dyneema® or Micro Dyneema®, polypropylene or any other material able to provide the mechanical properties required for such a joint, that is a very low bending strength and a high tensile strength and a high fatigue resistance.

For example in the case of cables of Dyneema® or Micro Dyneema®, the fibres can be braided and not formed from strands or they can be formed from strands.

In all the cases, the cables can be treated in depth or coated to promote for example their resistance to wear, moisture or ultraviolet rays. This treatment can be provided to each fibre individually and/or the whole cable.

Both rigid segments 2, 4 have a similar structure.

The first segment 2 comprises a first part 8.1 forming the body of the segment and a second part 10.1 located at a proximal end of the first segment and intended to come in the proximity thereof and advantageously in contact with the second rigid segment 4. The second part 10.1 is formed by an insert attached to the body 8.1.

The second segment 4 also comprises a body 8.2 and an insert 10.2 at its proximal end intended to come in the proximity thereof and advantageously in contact with the insert 10.1.

Figure 1B:
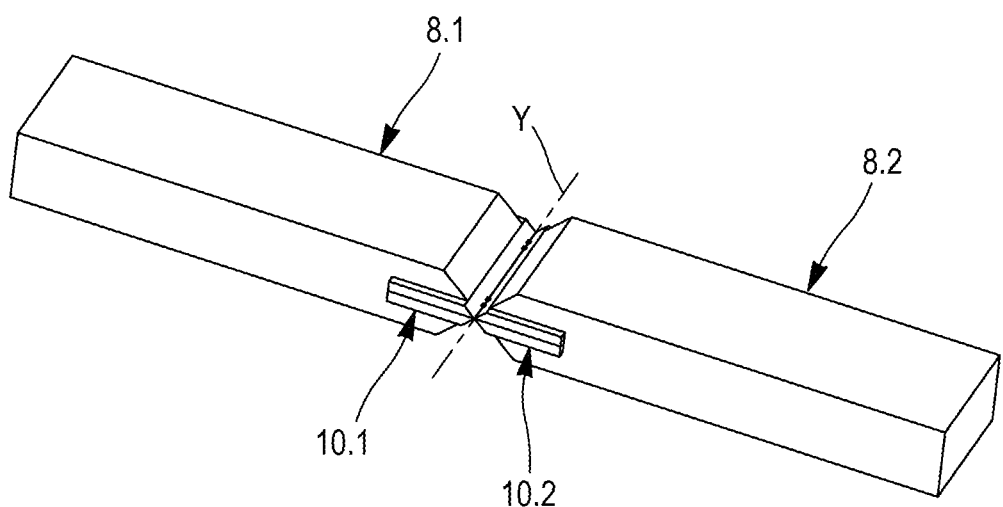
FIG. 1B is an alternative of the member of FIG. 1A, FIGS. 2A and 2B are perspective views of the alternative embodiments of inserts suitable for making jointed limbs according to the first embodiment.

In the example represented in FIGS. 1A and 1B, the inserts 10.1 and 10.2 comprise a lower part and an upper part receiving there between the cables they can contribute to hold, for example by clamping.

The proximal ends of the inserts have a cross-section, in a plane perpendicular to the joint axis, advantageously substantially triangular in order to allow a great angular displacement between both segments and ensure joint guiding. These inserts are made with a great accuracy. The free length of the cables between both proximal ends of the inserts is very small in order to make a very accurate joint.

Very advantageously, the proximal end of the inserts has a profile both ensuring a good mechanical strength and making a joint between both inserts as close as possible to a pivot. For example, this is a rounded profile. The rounded parts are very small throughout the width of the inserts. The contact line between these rounded parts, which can slightly vary depending on the rolling and sliding movements there between, defines the axis of rotation Y. Making these rounded parts requires a great accuracy so that the axis Y varies as little as possible during the movement. The diameter of the rounded part is typically in the order of magnitude of or slightly lower than the diameter of the cables or to their smallest dimension once clamped between the inserts. The rounded part can have the shape of a cylinder angular portion the generatrix of which is a circle, an ellipse or any other adapted shape.

The bodies 8.1, 8.2 also comprise a lower part and an upper part secured to each other, for example by means of screws as illustrated in FIG. 1A, simultaneously holding in place the inserts and also able to contribute to holding the cables through clamping. Other securing means are contemplatable, for example through riveting, gluing, welding or assembling by any other appropriate means.

The transverse edges of the joint, that is the parts of the inserts which are farthest from the axes X2 and X4 along the axis Y, are the most biased zones of the joint when parasitic strains are applied in all the directions. Advantageously, the filaments of cables are then provided on the transverse edges of the segments. One could also use only two cables or on the contrary more than four cables and place them all along the connection to reinforce it.

Very advantageously, the inserts 10.1, 10.2 comprise transverse holding means for the cables, preventing any movement along the axis of rotation Y. In the example represented and as will be seen more in detail later, the inserts are provided with grooves receiving each a cable. The grooves on both inserts are made so as to be aligned two by two along the longitudinal direction upon mounting the device. The holding means could also be formed by punching the surfaces of the inserts that are clamping the cables.

Since the cables have a very good tensile strength but substantially no bending strength, the main possible movement is the rotation about the transverse axis Y that does not vary much during the movement.

Also particularly advantageously, the inserts are of hard material, for example of steel or stainless steel. The structure then offers a very good mechanical strength and low wear, which wear is produced because of frictions between both inserts.

Advantageously, the bodies 8.1, 8.2 of the segments are of light material, which enables lightened structures to be made, for example of aluminium or plastic material.

Thus, advantageous combinations are obtained by associating a harder material for the inserts and a lighter material for the bodies, for example and in a non-limiting way steel for the inserts and aluminium for the bodies or aluminium for the inserts and plastic for the bodies or even a hard plastics for the inserts and a softer plastic for the bodies. However, the body and the insert of each segment could be made in the same material, for example aluminium, without departing from the scope of the present invention.

As described above, the cables are longitudinally held by clamping between the lower and upper parts of the inserts and/or the bodies of each segment. The facing surfaces of the upper and lower parts of the inserts and the bodies of the segments can even have an uneven surface state obtained for example through machining, sand blasting or punching, in order to hold the cables more efficiently. Alternatively, the cable(s) can be provided with nodes to promote this anchorage. Other parts as for example and in a non-limiting way pins perpendicular to the axes X2 and Y, respectively X4 and Y, and about which the cables would be wound that can even be inserted into the segments 2 and 4 to guide and/or further enhance holding of the cables.

Alternatively, the cables could be mounted longitudinally free in the inserts and the bodies and subsequently tensioned by an additional external tensioning system.

Upon mounting the jointed limb, the inserts 10.1, 10.2 are advantageously placed in contact with each other such that the free length of the cables is minimum. After assembly, the inserts do not move with respect to the bodies.

Advantageously, the inserts have a transverse dimension higher than that of the bodies and/or comprise lateral imprints, which enables them to be held in place using additional means not shown, for example, fixed supports or clamps, during the time necessary to carry out mounting of the body or moulding of the body onto the inserts.

In FIG. 1B, an alternative embodiment of the member of FIG. 1A can be seen, wherein the bodies 8.1, 8.2 are no longer in two mechanically connected parts to hold the inserts but are directly made by moulding about the inserts. They are thus in a single part, which simplifies the manufacture, even more if the bodies of both segments are moulded in a single operation using a single mould. The implementation of inserts having a great manufacturing accuracy is particularly interesting in this alternative, wherein the bodies are made with a much lesser accuracy, the positioning accuracy being provided by the mould.

In this alternative embodiment, it is particularly advantageous to have cables which longitudinally project from the bodies at the distal ends and to tension them upon moulding. As previously, once again other parts such as for example and in a non-limiting way, pins perpendicular to the axes X2 and Y, respectively X4 and Y, held by the mould and about which the cables would be wound before moulding so as to guide them and/or enhance holding thereof could be provided.

In this alternative embodiment, it is also possible to pass the cables through the sheaths, in particular at the bodies of the segments, such that at the end of moulding, the cables are not attached in the bodies and could be easily be tensioned and/or exchanged in case of wear.

Figure 2B:
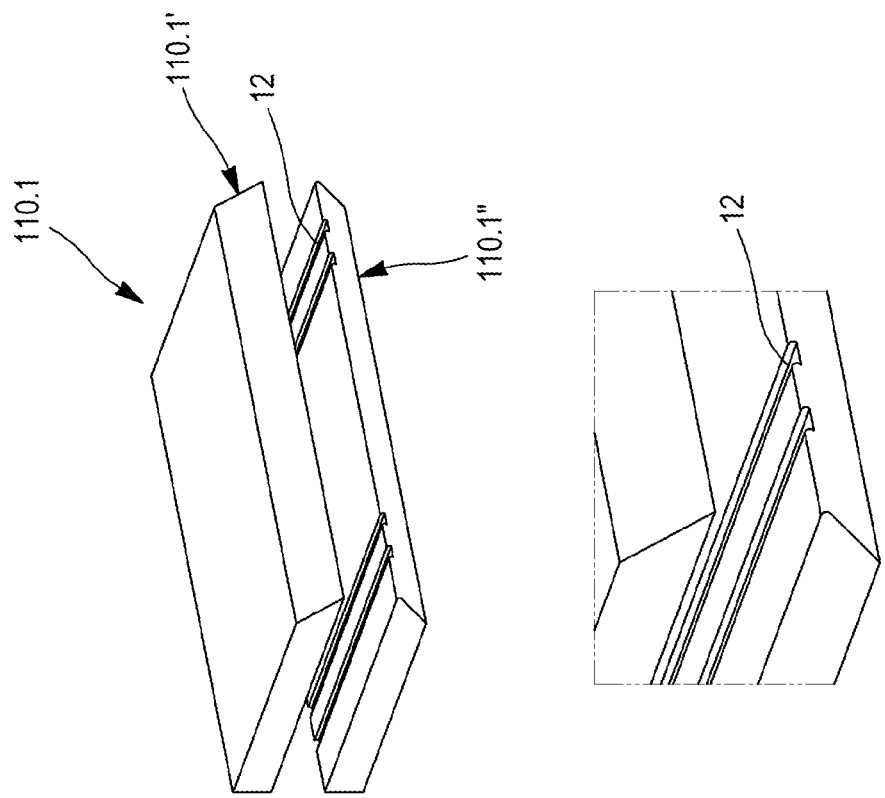
Figure 2A:
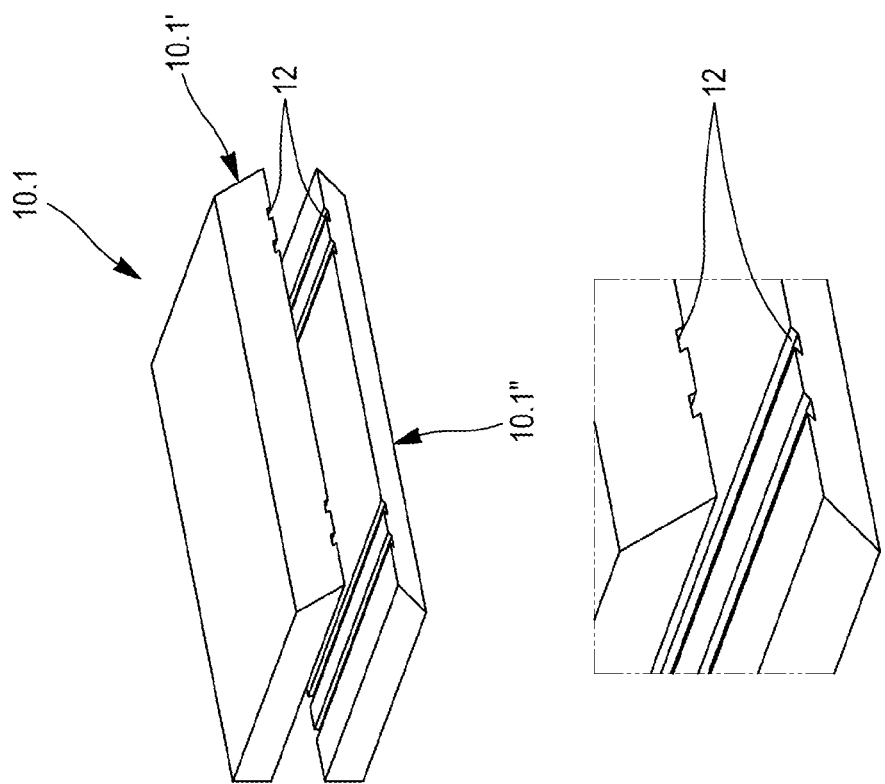

In FIGS. 2A and 2B, two different exemplary embodiments of inserts can be seen, which are represented alone, that can be implemented in the jointed limbs according to the first embodiment. These examples are provided by way of purely illustrative purposes and are not limiting.

In FIG. 2A, the insert 10.1 is the one implemented in the member of FIG. 1A, the latter comprises two parts 10.1', 10.1", each being provided with grooves 12 extending along the longitudinal direction and intended to face each other, so as to bound a housing for each cable. In the example represented, two pairs of housings are thus formed. Advantageously, the housings have a width close to or slightly higher than the diameter of the cables to facilitate their insertion and a height close to or slightly lower than the diameter of the cables so as to crush them without injuries. The cables are thus brought back as close as possible to the middle plane of the jointed limb so that the joint optimally operates. For example, for a 0.5 mm diameter cable, the total height of the housing can be 0.3 mm or 0.4 mm. As described previously, the grooves prevent any transverse displacement of the cables.

Further, each of the proximal ends of the parts 10.1', 10.1" has a bevelled shape such that when both parts of the inserts are superimposed, the insert has a proximal end having a tip-shape. Each of the proximal ends further advantageously comprises a rounded shape. In the case illustrated by FIG. 2A, the rounded shapes of the proximal ends of both parts 10.1', 10.1" are advantageously symmetrical such that the middle plane of the rounded part formed by assembling the parts 10.1', 10.1" of the insert is located in the middle plane of the cables.

This exemplary embodiment enables the inserts to be identically mass produced and thus the manufacturing costs to be reduced. For example, the inserts can be moulded or machined separately or along a long rod, which is then cut to separate each insert.

In FIG. 2B, another exemplary insert 110.1 can be seen wherein only one of the parts is provided with grooves 12 each having a depth enabling a cable to be entirely received. Moreover, in the case where a rounded part is made on the proximal end of the insert, the latter is only made on the part 110.1" provided with the grooves such that the medium plane of the rounded part is still located in the medium plane of the cables. This exemplary embodiment has the advantage that one of the parts 110.1" is very simple to be made, since all its faces are smooth.

In the examples represented in FIGS. 2A and 2B, the rounded parts have an arc of circle profile. Of course, this profile could be different and of any adapted type, for example and in a non-limiting way in an arc of ellipse or involute of a circle.

Figure 3:
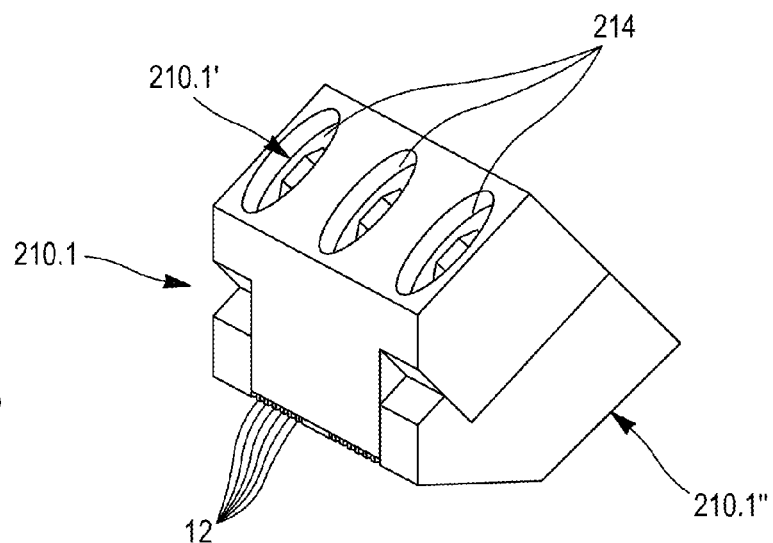
FIG. 3 is a perspective view of another alternative of insert suitable for making a jointed limb according to the first embodiment.

In FIG. 3, another exemplary embodiment of an insert 210.1 can be seen. This one differs from those previously described in that it can be assembled prior to assembling the bodies. The distal ends of the parts 210.1', 210.1" comprise assembling means 214, for example through screwing, after placing the cables.

Alternatively, the inserts could be made as a single piece, wherein holes would then be bored or pierced for reeving cables.

Figure 4:
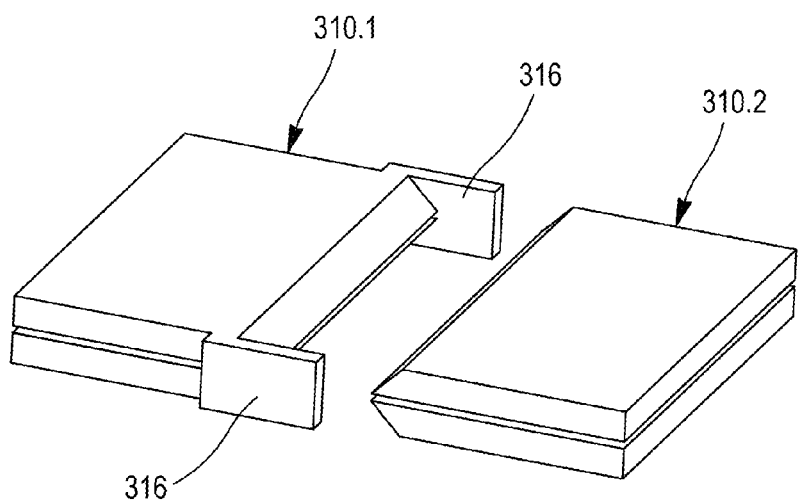
FIG. 4 is a perspective view of an exemplary insert suitable for making a jointed limb according to another example of the first embodiment.

In FIG. 4, another alternative embodiment of the inserts 310.1, 310.2 can be seen. These differ from those previously described in that the means for restricting a movement along the axis of rotation are formed by two lateral flanges 316 carried by one of the inserts 310.1 and intended to receive the proximal end of the other insert 310.2.

Thus, when the jointed limb is assembled, i.e. when the cables are tensioned and the inserts in contact, the movements of the inserts and the segments along the axis of rotation Y are impossible. Alternatively, the flanges could also be made on the segments. In both cases, however, the contacts between the flanges and the insert or the segment facing each other decrease the transparency of the device compared to the inserts provided with grooves according to the example previously described.

Figure 5:
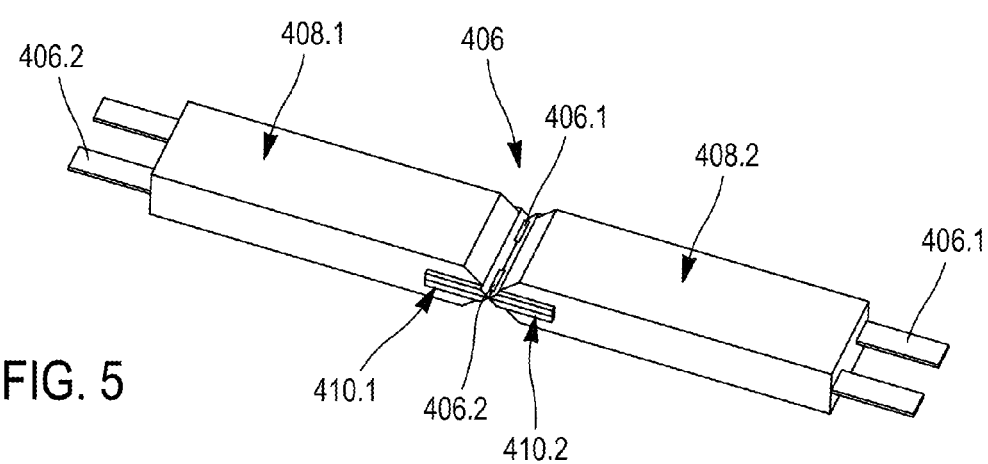
FIG. 5 is a perspective view of another exemplary of a jointed limb according to the first embodiment, wherein the joint is made using strips of woven or non-woven fibrous material.

In FIG. 5, another exemplary jointed limb according to the first embodiment can be seen, wherein the joint 406 comprises two strips or plies 406.1, 406.2 of fibrous materials. In this example, the bodies 408.1, 408.2 are moulded around the inserts 410.1, 410.2. Of course, they could also be assembled as in the exemplary embodiment of FIG. 1A.

The fibrous material of strips or plies which form the joint 406 can be of the woven type, that is it is obtained by weaving weft yarns and warp yarns. It then offers a high resistance along the axis of the weft yarn and along the axis of the warp yarn.

The strips or plies of fibrous material can also be formed by a non-woven material. In this case, it is made of a web or a ply of individual fibres directionally or randomly oriented, in particular bonded by friction and/or cohesion and/or adhesion.

Advantageously, the orientation of the fibres enables a favourite direction of tensile strength to be determined.

In all the cases, the fibrous material can be treated in depth or coated to promote for example its resistance to wear, moisture or ultraviolet rays. This treatment can be provided to each fibre individually and/or to each entire strip or each entire ply.

Of course, the width of the strips or plies can vary without departing from the scope of the invention. Thus, there could also be a single strip or ply, with the proviso that its width is sufficient to prevent parasitic movements, in particular movements of rotation about the axes X2 and X4. Thus, in the case where a single strip or ply is used, it will advantageously be as wide as possible and will extend on most of the width of the inserts.

Advantageously, grooves are provided in the inserts to restrict the transverse displacement of the strips. The grooves have a sufficient width to wholly accommodate each strip.

The exemplary inserts previously described in connection with a cable joint are wholly applicable to a strip joint, and conversely.

Further, making joints associating cables and strips can be provided.

In FIGS. 6A and 6B an exemplary jointed limb according to a second embodiment is represented. This differs from the first embodiment in that the cables and/or strips are not provided inside the inserts and segments but run on the outer faces of the inserts.

As can be seen in FIGS. 6A and 6B, the jointed limb comprises two segments 502, 504 each formed by a body 508.1, 508.2 and by an insert 510.1, 510.2 and a joint 506.

In the example represented, the inserts 510.1, 510.2 are each formed as a one piece. They comprise a proximal end having a cross-section, in a plane perpendicular to the axis of the joint, advantageously globally triangular and a distal end intended to form a part for anchoring with the body.

Both inserts 510.1, 510.2 are contacting each other through their proximal ends.

As for the first embodiment, the inserts are advantageously made of hard material, such as steel, and the bodies of light material, for example aluminium or plastic material.

As for the first embodiment also, the proximal end of the inserts can be locally rounded, with an arc of circle profile or other.

In the example represented, the body is made as a single piece and moulded on the insert anchoring part. However, it can be considered making the body in two parts assembled together and with the inserts with an attachment by screw, rivet, glue, welding or any other suitable means.

The joint is formed by cable filaments attached to a lower face, respectively upper face of the segment and on a upper face, respectively, lower face of the other segment. The cable filaments then run along the bodies 508.1, 508.2, and the tilted faces of the inserts 510.1, 510.2.

Advantageously, the inserts 510.1, 510.2 comprise grooves 512 on their tilted faces to guide the cable filaments. The grooves 512 have advantageously a depth selected such that the total depth of the facing grooves is substantially equal to or slightly lower than the diameter of the cable. In this case, the part of the cable filaments located at the axis of rotation Y is wholly transversely stressed.

In the examples of FIGS. 6A and 6B, two assemblies of four cables 505 are used to make the joint. To guide these cables, the inserts 510.1, 510.2 comprise on each tilted face two groups of four grooves 512, each groove having a depth close to or slightly lower than half the diameter of the cable, thus letting a space of depth substantially equal to the diameter of the cable at the interface between both inserts. The cable 505 only actually travels two grooves per group. This embodiment enables to have only a single insert model which may be used for both segments. Indeed, as can be seen in FIG. 6B, these are not the same grooves 512 which have the cables on the insert located on the left and the insert located on the right. This embodiment allows a high cost saving and a simplified manufacture of each segment.

In the example represented, the cable filaments are advantageously located at both transverse ends of the segments and inserts. In the example also represented, the cable filaments are staggeredly provided, a cable filaments of a segment alternating with a cable filaments of the other segment. This embodiment is not limited.

In the example illustrated in FIGS. 6A and 6B, the cable filaments form four loops obtained for example by gluing, tying or assembling two cable ends using splices. These loops pass around the pins 513 projecting from the bodies, which keeps the segments in contact. Advantageously, a cable tensioning system could be provided, such as for example and in a non-limiting way a turnbuckle, an eccentric or an adjusting screw. These means are well-known to those skilled in the art and will not be described here in further details.

The 8 cables of 2 assemblies of 4 cables could further be independent and each attached to the segments 502 and 504.

In this case, several cable filaments could advantageously be used for each transverse end, the free ends of which would project from the segments. The cables would then be tensioned upon assembling the jointed limb, for example during a moulding step.

In FIG. 7, an alternative of the jointed limb of FIGS. 6A and 6B can be seen, wherein the bodies 508.1', 508.2' are moulded on the cables 505. In this case, the cables are trapped by the segments after moulding. To promote the anchoring thereof in the material of the bodies, cable loops can be made provided around inserts as in FIG. 6A. Independent cable filaments advantageously projecting from the segments can further be used to be able to tension them upon moulding. In this case, it could be advantageous that the cables are provided with nodes to promote such an anchoring. As previously, other parts such as for example and in a non-limiting way pins perpendicular to the axes X2 and Y, respectively X4 and Y, and about which the cables could be wound, can further be inserted into the segments 502 and 504 to guide and/or further enhance holding of the cables. These devices are of course not limiting and any other means enabling anchoring of the cables into the segments 502, 504 to be promoted can be used.

Besides, in this alternative also, it would be possible to reeve the cables through sheaths, in particular at the bodies of the segments, such that at the end of moulding, the cables are not attached in the bodies and can be easily tensioned again and/or exchanged in case of wear.

Figure 8A:
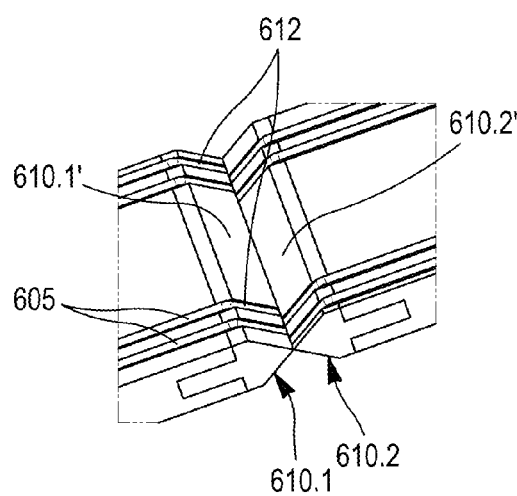
Figure 8B:
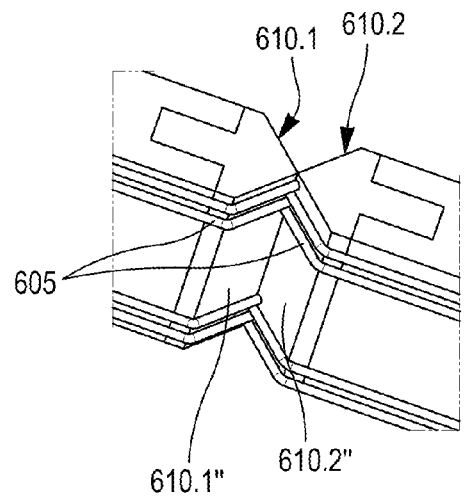

In FIGS. 8A and 8B, another alternative of the second embodiment can be seen, wherein the inserts 610.1, 610.2 comprise a number of grooves 612 equal to the number of cable filaments 605. Further, only one 610.1', 610.2' of the tilted faces of each insert 601.1, 610.2 comprises grooves 612 the depth of which is substantially equal to or slightly lower than the diameter of the cable. Each cable filament travels in a groove 612 on a tilted face 610.1', respectively 610.2', of an insert 610.1, respectively 610.2, and then when it passes on the other insert 610.2, respectively 610.1, it travels on the tilted face 610.2", respectively 610.1", without grooves, of the other insert 610.2, respectively 610.1 (FIG. 8B). The number of machinings per insert is thus reduced.

On the example represented in FIGS. 8A and 8B, the grooves are made on the faces 610.1' and 610.2' and the faces 610.12" and 610.2" are smooth. Of course, the grooves could also be made on any other combination of two faces enabling the cables to be held in the direction of the axis of the joint, for example the faces 610.1' and 610.1", both other faces, for example 610.2' and 610.2" being smooth. It can also be considered making jointed limbs comprising a segment with an insert provided with grooves on its two tilted faces and associating it with a segment the insert of which comprises no groove on tilted faces. Upon manufacturing, smooth inserts would be mass produced, and then half of them would be machined.

In the examples represented in FIGS. 6 to 8, the grooves have a constant depth. Of course, they could also have a variable depth, for example null on the segment bodies side and a sufficient depth to receive the cables or strips of fibres in proximity to the joint.

In another exemplary embodiment not represented, the guide means are formed by two lateral flanges on the inserts and/or the segments as in FIG. 4.

Figure 9A:
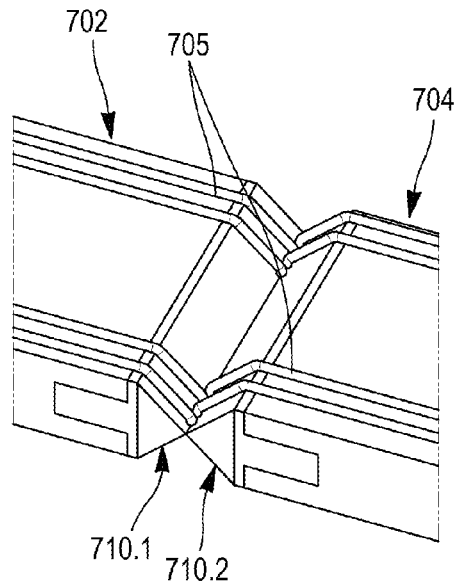
FIG. 9A is a perspective view of another example of embodiment of a jointed limb according to the second embodiment.
Figure 9B:
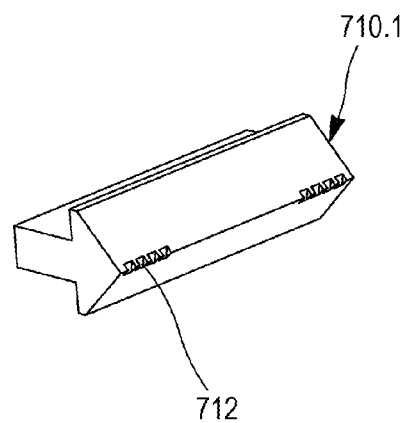
FIG. 9B is a perspective view of the insert of the example of FIG. 9a represented alone.

In FIGS. 9A and 9B, another exemplary embodiment of a jointed limb according to the second embodiment can be seen, wherein the guide means are formed by notches 712 only made at the vertices of the inserts. These notches 712 enable once again a cable to intersect the connecting axis while ensuring blocking along the axis. These are very simple and very cheap to be made, as shown in FIG. 9B. Each insert 710.1, 710.2 comprises two groups of four notches 712. On each group of four notches, two of them receive the cable filaments 705 passing from the upper face of the segment 702 to the lower face of the segment 704 and the both other cable filaments 705 passing from the lower face of the segment 704 to the upper face of the segment 704. This enables a single insert model to be manufactured.

Of course, as for the first embodiment, a different number of cables could be used in the examples of FIGS. 6 to 9. Only two pairs of crossed cables passing in the proximity of the transverse ends of the inserts could be used or on the contrary more than four pairs of crossed cables to reinforce the joint.

Of course, the inserts can also have once again locally triangular or rounded proximal ends.

Figure 10:
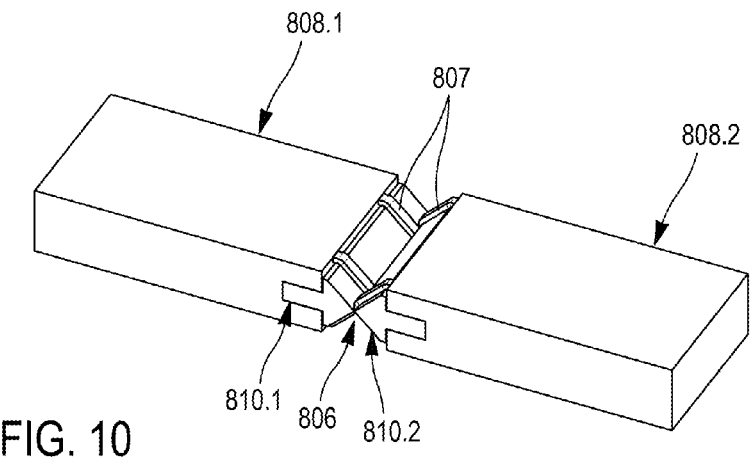
FIG. 10 is a perspective view of another exemplary embodiment of a jointed limb according to the second embodiment, wherein the joint is made using strips of woven or non-woven fibrous material.

In FIG. 10, another exemplary jointed limb according to the second embodiment can be seen, wherein the joint 806 is formed by strips 807 of woven or non-woven fibre. In this example, the body 808.1, 808.2 is moulded on the insert 810.1, 810.2 and on the strips of fibres 807. As previously, the strips advantageously project from the mould so as to be able to tension them upon assembling the device and then they are embedded in the material of the segments, which enables them to be held in place. Further, this moulding on the strips ensures a protection to the external environment. As previously, a different number of strips or plies, or even a single strip having a greater width could be used.

Of course, as for the jointed limbs using cables, it would be possible in this case as on all the jointed limbs made by moulding the segment bodies onto the inserts to pass the strips or plies of woven or non-woven fibres into sheaths having suitable shapes such that they are not attached in the bodies of the segments the end of moulding and can be tensioned again or replaced in case of wear.

In the exemplary embodiments of FIGS. 6A, 6B, 8A, 8B, 9A, 9B and 11, an added cap could be provided to protect the cables or strips. Further, these configurations where the cables are apparent enable them to be changed in case of wear or break, which promotes maintenance of the device.

Figure 11A:
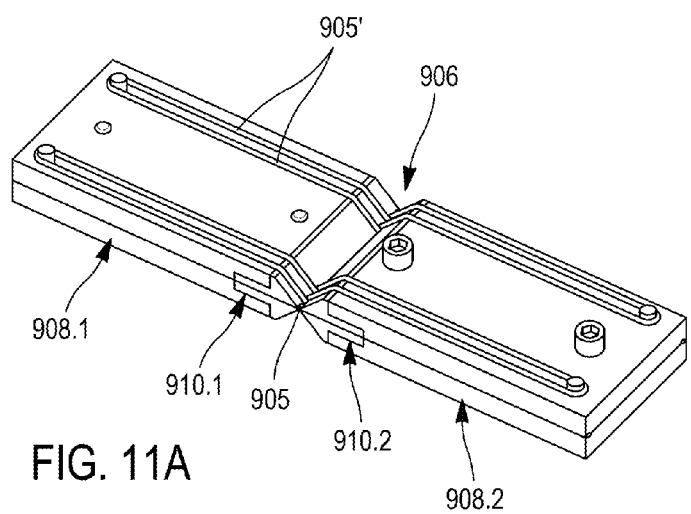
FIGS. 11A and 11B are perspective views of an example of a jointed limb and the insert according to a third embodiment.
Figure 11B:
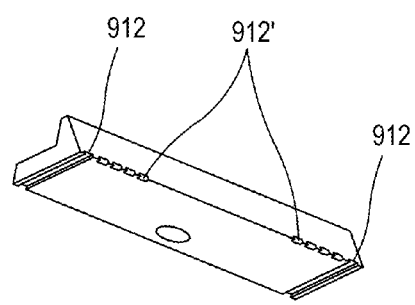

In FIGS. 11A and 11B, a third embodiment is represented. It combines the first and second embodiments, the joint 906 is then formed by cables 905 which are accommodated in the inserts 910.1, 910.2 and cables 905' which run on the inserts 910.1, 910.2 and/or the bodies 908.1, 908.2 of the segments. In FIG. 11B, only one of both parts of the insert is represented.

In the example represented, the inserts 910.1, 910.2 are in two parts provided with grooves 910 (FIG. 11*b*) for guiding the cables 905 accommodated in the inserts and notches 912' in the vertices of the inserts 910 to guide the cables 905' travelling on the inserts.

The exemplary inserts of the first and second embodiments may be combined and implemented in the jointed limb according to the third embodiment. For example, the bodies can be overmoulded on the inserts and the cables can form loops about the pins on the bodies. A moulding could be provided on the cables. The cable guiding could be made by the different types of grooves previously described.

Figure 12:
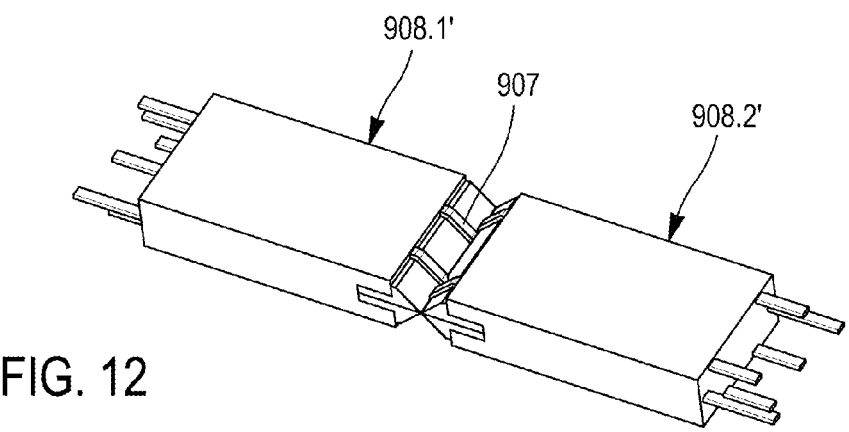
FIG. 12 is a perspective view of another exemplary jointed limb according to the third embodiment.

In FIG. 12, another exemplary jointed limb according to the third embodiment can be seen, wherein the cables are replaced by strips of woven or non-woven fibres 907. In this example, the strips 907 longitudinally project from the distal ends of the body, which enables them to be tensioned upon moulding.

The examples described for each of the embodiments do not form an exhaustive list and the different examples may be combined, in particular as regards the joint, inserts and bodies.

Thus, the previously described examples use either cables, strips or plies of woven or non-woven fibrous material. Of course, any combination of cables and strips is also usable regardless of the embodiment.

The jointed limbs of the different embodiments described could be equipped with one or several measuring elements.

This measuring element can have the form of a thin flexible film. This measuring element may for example be comprised of two thin electrodes deposited on a thin element of flexible polymer the deformation of which will result in a variation in the shape of the electrodes and/or the distance between electrodes, therefore in the resistance or capacitance of the device. It can be formed from a flexible plastic material or conducting polymer (loaded with metal particles for example) the resistance of which varies as a function of its deformation, for example as wires. Alternatively, it can also consist of one or more optical fibres associated with an emitter (for example a diode) and a receiver (for example, a photodiode). In this case, the quantity of light transmitted through the fibre varies as a function of its curvature and the measurement of the quantity of light received by the receiver gives an image of the joint angle. It can also be a woven or non-woven fibrous material, for example loaded with metal particles, and the electric properties of which, for example the resistance or capacitance between two probes, varies as a function of the joint configuration. In this case, the fibrous material could advantageously be the same as that of the joint. These measuring devices are known to those skilled in the art and will not be described in further detail herein. In particular, the elements for electronically and computationally processing signals representative of the resistance or capacitance of the device and which should be processed to rebuild an image of the material deformation, thus of the joint angle will not be presented. For the sake of simplicity, these measuring elements as well as the power supply and wiring elements for the measuring elements are not represented.

In the exemplary embodiments where the cables or strips forming the joint are clamped in the inserts, the longitudinal ends of the measuring elements could also be clamped in the inserts at the same time as the cables or strips.

Such measuring elements are very compact and very flexible and provide little resistance to the joint movements. They enable the joint position to be known at any time.

In another example, the measuring element may be placed in parallel to the joint. For example, it could be formed by a diode placed on one of the segments and a photodiode placed on the other segment and connected by an optical fibre passing close to the joint, for example by intersecting the axis Y and by passing close to the inserts or by passing above or below the inserts, an optical fibre the optical losses of which increase with the radius of curvature. Thus, the light received by the photodiode would be a function of the distance between it and the diode therefore of the angle between both segments. In the same way, two coils deposited on a flexible film and operating as antennas the inductive coupling of which is a function of the angle between segments could be used. Strain gauges provided on a flexible membrane the deformation of which causes strains in the gauges as a function of the joint angle could also be used.

Very advantageously, the sensor may be formed by a part carried by the first segment and a part carried by the second segment without mechanical connection between both parts. This sensor type has the advantage of being completely transparent at the joint. Indeed, the measuring elements previously presented add a resistance at the joint, which is not the case here. It can be for example and in a non-limiting way a coil deposited or glued on one of the segment, for example on one of the inserts, and a second coil deposited or glued on the other segment, for example on the other insert, and operating as antennas the inductive coupling of which is a function of the angle between the segments. It can also be a coil deposited or glued onto one of the segments, for example onto one of the inserts, and a magnet attached to or glued on the other segment, for example on the other insert, and that changes electrical or magnetic field of the coil as a function of the angle between the segments. It can also be a diode attached to one of the segments, for example to one of the inserts, and a photodiode or a linear or surface PSD attached to the other segment, wherein the quantity of light received by the photodiode and/or the position of the diode image on the PSD varies as a function of the joint angle. It can also be a miniature camera attached to one of the segments and the image of the second segment of varies with the joint angle.

The sensor can further provide an indirect measurement of the joint position. It could thus for example and in a non-limiting way consist of a first accelerometer deposited or glued on one of the segments, for example on one of the inserts, and another accelerometer attached to or glued on one of other segment, for example on the other insert, and the combination of measurements of which enables the joint acceleration and then, by possibly filtered double integration, its position to be calculated.

Of course, these examples are not limiting and a jointed limb according to any of the embodiments could be equipped with any other device for measuring the joint position, speed or acceleration without departing from the scope of the invention.

Further as will be seen later, the jointed limbs generally comprise inserts at each of their longitudinal ends to allow poly-jointed structures to be made, for example of the parallelogram type. Each jointed limb does not necessarily comprise, at its two ends, the same type of joints and inserts, and all the combinations are contemplatable. For example, it could be considered that at both ends, it is a jointed limb according to the first embodiment, with for a first one a cable joint and for the other one a strip joint. It could further be considered that at both ends, these are members according to two different embodiments. The use of the same embodiment and the same technical solutions will be however advantageously chosen for all the joints of a same structure since this enables the manufacturing cost thereof to be minimized.

Besides, in the exemplary embodiments previously presented, overall the inserts are symmetrical with respect to the cable plane of the fibrous material and the bodies of the segments and inserts are contained in the same plane. This arrangement is particularly advantageous to obtain symmetrical angular displacements with respect to a reference configuration where the segments are located in the same plane.

In the case where it is attempted to achieve different angular displacements in both directions about the axis Y or in the case where it is desired to make a more complex structure wherein the segments are no longer extending from each other in the reference configuration, a different configuration will be advantageously used. For example, this could be such that the bodies of the segments are not contained in the insert plane defined as the bisecting plane of the tilted faces of these inserts. As will be seen later, the bodies of the segments could be located in planes orthogonal to the insert planes or having any tilt with respect to the same as a function of the structure of the mechanism to be made. Without departing from the scope of the invention making a bevel having a different angle on both tilted faces of the inserts would be possible, or making only a bevel on one of its faces. These angles could besides be identical or different on the facing inserts. Both these examples are not limiting and any other means enabling the movements in one direction to be promoted could be used.

The jointed limbs according to the invention can be used to make poly-jointed mechanical lines. They are particularly suitable for making small size mechanisms because they are compact and light, for making portable mechanisms because they are light and solid, and mechanisms having a complex kinematic architecture (parallel and/or coupled) because they are compact and simple to make. Thus, the assembly of a complex mechanism can be moulded in a single operation, with the use of moulds having a sufficient size and enabling the assembly of cables and strips and the assembly of inserts to be held during moulding.

Figure 13:
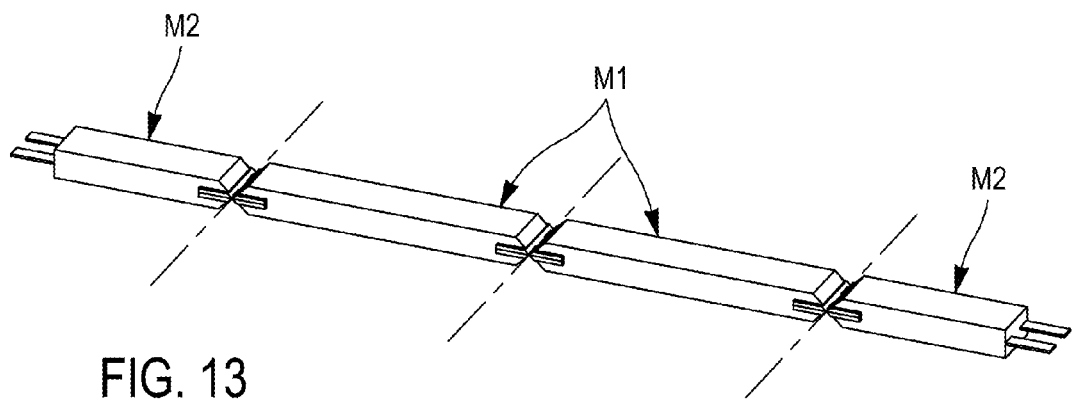
FIG. 13 is a perspective view of an exemplary embodiment of a poly-jointed mechanism comprising jointed limbs according to the invention.

In FIG. 13, an exemplary poly-jointed mechanism made from jointed limbs according to the invention can be seen.

In this example, the mechanism comprises three jointed limbs according to the invention provided in series. A first segment M2 jointed to only one of its ends is connected by a first joint to a first segment M1 jointed to both its ends, the segment M1 is connected by a second joint to a second segment M1 also jointed to both its ends, the second segment M1 being itself connected by a third joint to a second segment M2 jointed to only one of its ends. Very advantageously, this mechanism can be achieved by simultaneously moulding all the three jointed limbs, which here are of the type of those of FIG. 5. In this case, the mould advantageously integrates devices enabling the inserts and cables to be held upon injecting the material into the segments. To tension the strips of fibres during this phase, these advantageously project from the external segments such that they can be held and tensioned. Alternatively, cable filaments could also be used. This exemplary mechanism is not limiting and such a mechanism can be made with all the exemplary jointed limbs described previously.

Such a mechanism can also be achieved by making each of the connection separately and then by conventionally assembling to each other the segments, for example by gluing, riveting, screwing, welding, etc.

Figures 14A, 14B:
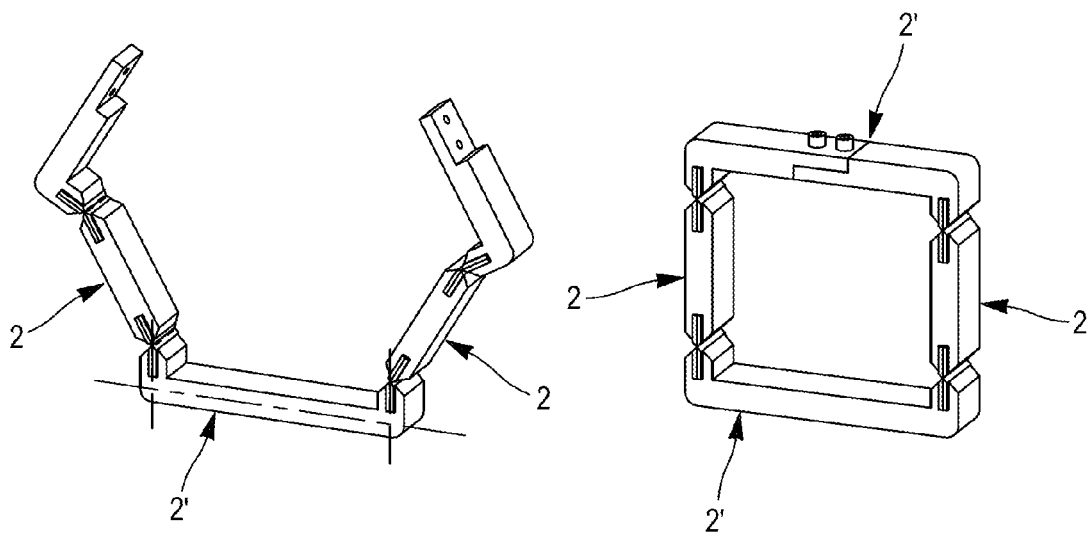
FIGS. 14A and 14B are perspective views of another exemplary embodiment of the poly-jointed mechanism comprising jointed limbs according to the invention, having a closed loop configuration.

In FIGS. 14A and 14B, another exemplary poly-jointed mechanism can be seen. In this example, the mechanism forms a closed loop.

This mechanism comprises straight segments 2 and bent segments 2'. In the case of bent segments, the longitudinal axis of the body 8' and the longitudinal axis of the insert 10' form, in the example represented, a right angle.

Such a mechanism can be made in two steps, a first moulding step similar to that of the mechanism of FIG. 13 and then a step of closing the mechanism by a mechanism assembly, for example by means of screws as represented in FIG. 14B. A jointed parallelogram is thus obtained. The structure of FIG. 14B enables great angular displacements to be provided in both directions.

Other mechanisms can of course be made, those of FIGS. 13 and 14 being only provided by way of examples.

Such mechanisms and more generally such jointed limbs can be motorized in order to move one of the segments with respect to the other about the axis of rotation, or even to provide with a brake to counteract a displacement of one of the segments with respect to the other, for example in force feedback systems.

Figure 15:
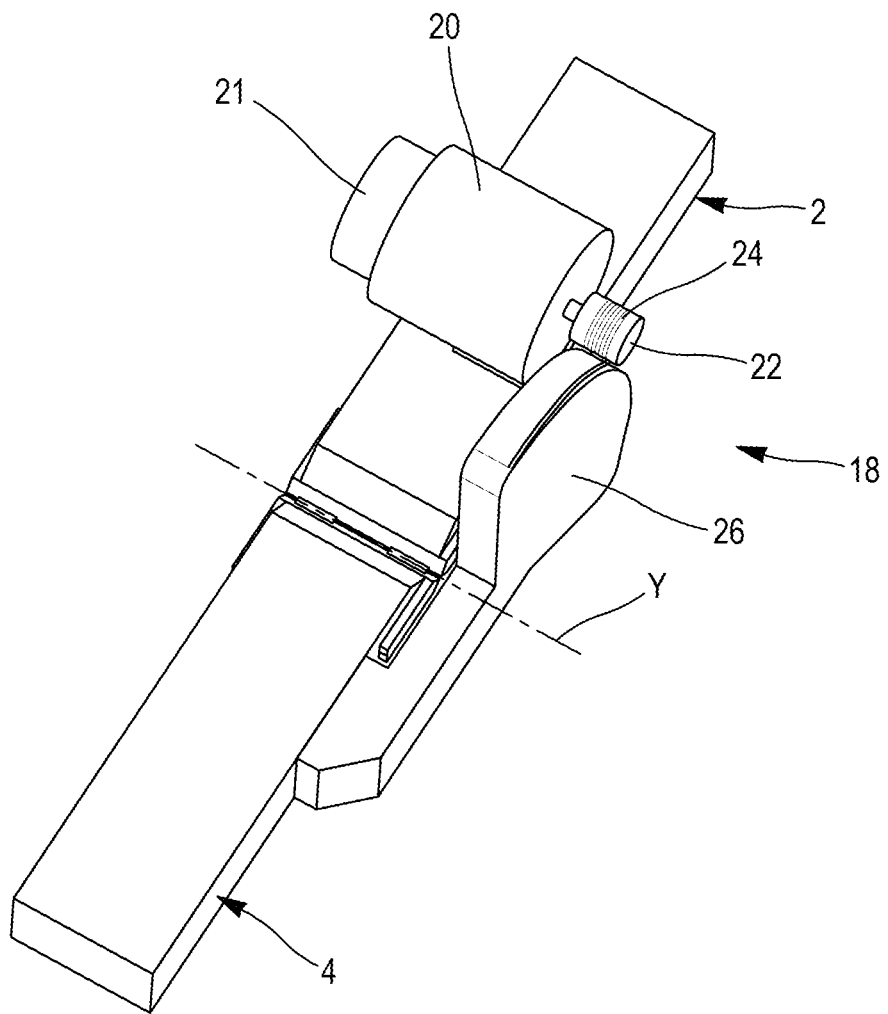
FIGS. 15, 16 and 17 are perspective views of exemplary actuated structures integrating at least one jointed limb according to the present invention.

In FIG. 15, an exemplary jointed limb can be seen such as that represented in FIG. 5 being actuated. In the example represented, the actuating device 18 comprises a motor 20 advantageously provided with an angular position sensor 21 and attached to the segment 2 which drives the other segment 4 through a capstan reducer comprising a first pulley 22 directly engaging the shaft of the motor 20, a cable 24 wound several times on the first pulley 22 to avoid sliding on the same and attached at both its end to a second pulley 26 of axis Y which is attached to the other segment 4.

The second pulley 26 provided with a support could be added to the segment 4, for example by screwing, gluing or welding. Alternatively, it could be moulded at the same time as this segment with which it then forms a single part.

Preferably, the first pulley 22 has a smaller diameter, and the second pulley has a greater diameter.

Thus, as soon as the motor is rotatably driven or exerts a torque on the first pulley 22, this displacement or torque is transmitted to the other segment 4 via the pulley 26. In the same way, if the segment 4 is displaced or if a strain is exerted on it, this displacement or strain is transmitted to the motor 20. This type of reducer has the advantage of being reversible, very transparent and of a very high yield. Thus, the movements of the movable segments can be measured and controlled accurately using a motor position sensor and/or a sensor directly placed at the joint. In the same way, the strain on the movable segment can be measured and regulated accurately using the motor torque and/or an additional strain sensor. The motor torque can be advantageously assessed from the current flowing in its coils if it is an electrical actuator.

The first pulley 22 can be smooth or threaded to promote anchoring of the cable on the same. The anchoring of the cable ends on the second pulley and the means for tensioning this cable are made by any known means and will not be described in detail here.

Other types of reducers can be used, for example and in a non-limiting way gear, friction, ribbon, worm gear reducers, etc. In the same way, the angular position sensor can be of any type, for example an optical coder, a Hall effect sensor, a magnetooptical sensor, . . . .

The motor can also be of any appropriate type, for example a direct current electric motor, a Brushless motor, a pneumatic or hydraulic actuator, a shape memory alloy, an electroactive polymer, . . . . A brake could also be used, for example with electrorheological or magnetorheological fluids, a disk, powder brake, . . . . A motor associated with a brake, in series or parallel, or two or more motors, in series or parallel could be used, for example two antagonistic motors connected to the secondary pulley by flexible transmissions being drivable or not.

Figure 16:
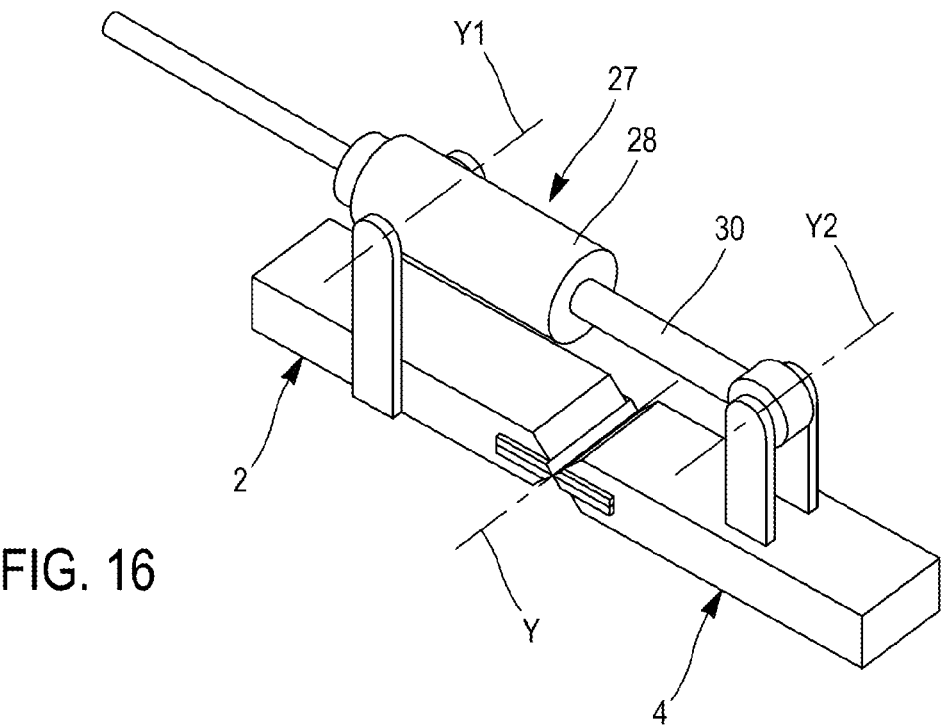

For example, in FIG. 16, the implementation of a pneumatic or hydraulic actuator can be seen to displace one of the segments with respect to the other.

In the example represented, the actuator comprises a jack 27 the body 28 of which is rotatably jointedly mounted to the segment 2 about an axis Y1 parallel to the axis of rotation Y and the rod 30 is jointedly mounted at its free end on the other section 4 about an axis Y2 parallel to the axis of rotation Y. The jack 27 can be equipped with any type of position sensor enabling the position of the rod 30 to be measured with respect to the body 28, for example and in a non-limiting way a LVDT sensor or a linear potentiometer. Of course the connections of axes Y1 and Y2 could besides also be used using jointed limbs according to the present invention.

Figure 17:
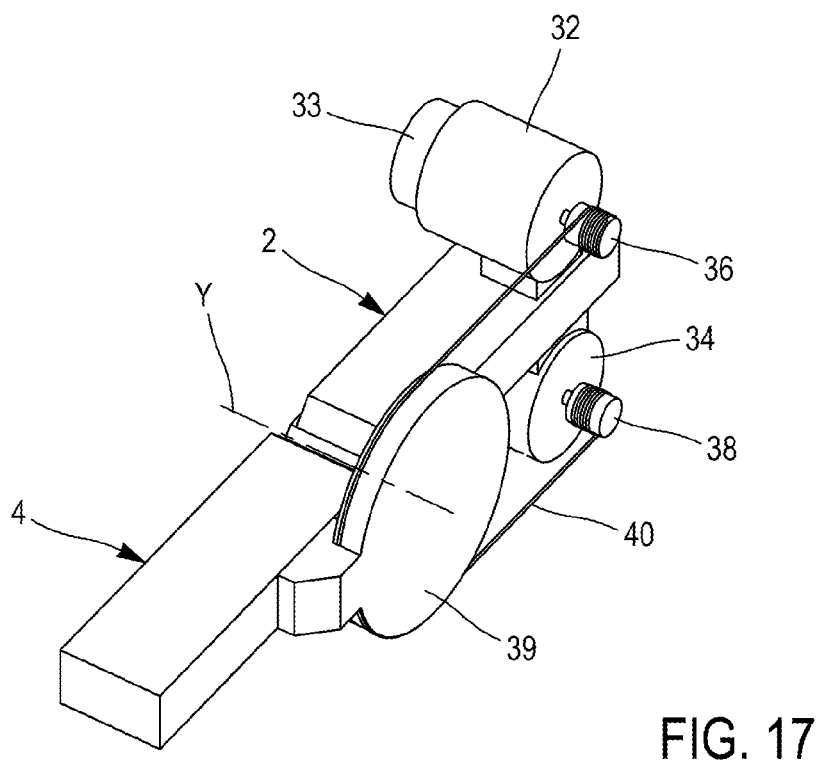

In FIG. 17, an actuating device can be seen comprising two antagonistic motors 32, 34 mounted, in the example presented, for the first one on a face of the segment 2 and for the other one on an opposite face of the segment 2. The motors 32, 34 are advantageously provided with angular position sensors 33, 35 (hidden in FIG. 17). A pulley 36, respectively 38 is mounted in direct engagement to the shaft of the motor 32, respectively 34. A great diameter second pulley 39 is integral with the other segment 4. A cable 40 formed by a single filament or two distinct filaments each associated with a motor travels and is attached to the pulley 39 and is wound and attached at a first end to the pulley 36, and at a second end to the pulley 38. The antagonistic operation of both motors enables both upwards or downwards the swinging about the axis Y of the segment 4 and the internal strains in the joint to be driven.

Also, between the pulleys 36, 38 and the pulley 39 flexible mechanisms having a constant or variable stiffness, being driven or not can be inserted. These devices, for example of the SEA (Series Elastic Actuators) type are being intensively developed. They are known to those skilled in the art and are not detailed herein.

The previously described mechanisms, actuated or not, can be associated to make a robot provided with a clamp or any other gripping device or a haptic interface provided with a handle or any other gripping means intended to be manipulated by an operator.

Figure 18:
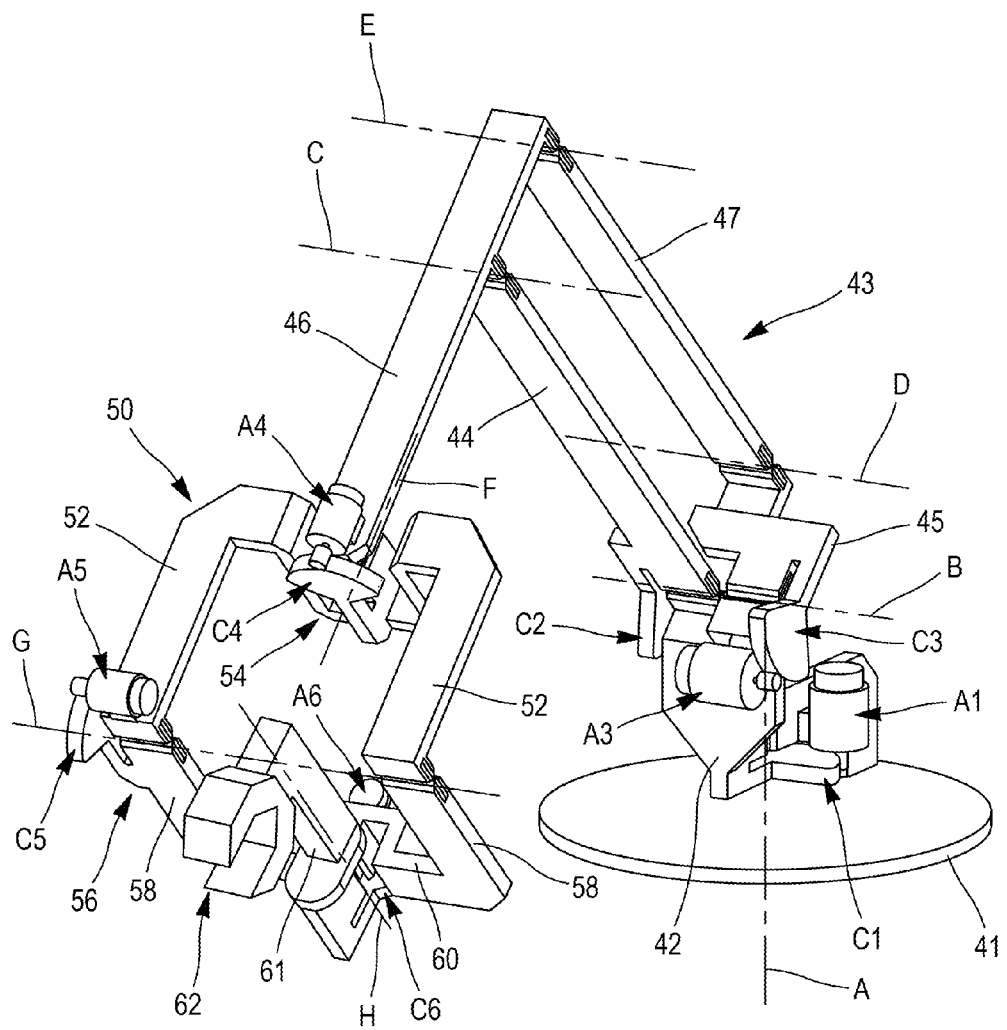
FIG. 18 is a perspective view of an exemplary embodiment of a robot using jointed limbs according to the invention.

An exemplary robot is represented in FIG. 18. It comprises a first jointed limb similar to that of FIG. 15 consisting of a base 41, a first movable segment 42 and a joint of vertical axis A actuated by a motor A1 attached to the base 41 and ensuring the displacement of the segment 42 about the axis A by virtue of a first capstan reducer C1 the secondary pulley of which is attached to the segment 42. In this figure and the following one, the capstan cables are not represented for simplifying purposes.

The robot also comprises a jointed parallelogram 43 similar to the mechanism of FIG. 14B but comprising a further joint to ensure its mobility with respect to the segment 42. This parallelogram thus comprises 5 jointed limbs, the first member consisting of the segment 42, a second movable segment 44 and a joint of horizontal axis B, and actuated by an actuator A2 attached to the segment 42 (and not-visible in FIG. 18) through a capstan reducer the secondary pulley C2 of which is attached to the segment 44, the second member consisting of the segment 42, a third movable segment 45 and a joint of an axis B identical to that of the second jointed limb, and actuated by an actuator A3 also attached to the segment 42 through a capstan reducer the secondary pulley C3 of which is attached the segment 45, the third, fourth and fifth members being passive and respectively consisting for the third member of the segment 44, a fourth movable segment 46 and a joint of axis C, for the fourth member of the segment 45, a fifth movable segment 47 and a joint of axis D and for the fifth member of the segments 46 and 47 and of a joint of axis E. The axes B, C, D and E are parallel to each other and the distances between the axes B and D and between the axes C and E are equal, as well as the distances between the axes B and C and between the axes D and E. The segment 47 acts as a connecting rod and transmits movements and strains from the segment 45 to the segment 46.

The robot further comprises a wrist provided with a clamp. This wrist comprises three joints implementing four jointed limbs according to the invention.

The first member consists of the end of the segment 46, the movable segment 50 comprising two parallel arms 52 rigidly connected by a U part 54 and of a joint of axis F advantageously parallel to the main elongation direction of the segment 46. It is actuated by an actuator A4 attached to the segment 46 through the capstan reducer the secondary pulley C4 of which is attached to the U part 54.

The second and third members consist of portions of two parallel arms 52 located at their opposite end to that connected to the U part 54, of two parallel arms 58 rigidly connected by a cross piece 60 so as to form a U part 56 and two collinear joints of axis G allowing a single mobility of the segment 56 with respect to the segment 50 about the axis G. The second jointed limb is actuated by an actuator A5 attached to one of the arms 52 through a capstan reducer the secondary pulley C5 of which is attached to the facing arm 58. The third member is passive.

The cross piece 60 carries an eighth movable segment 61 provided at its free end with a clamp 62. The cross piece 60 forms together with the segment 61 and a joint of axis H a jointed limb actuated by an actuator A6 attached to the cross piece 60 through a capstan reducer the secondary pulley C6 of which partially visible in FIG. 18 is attached to the segment 61. An actuator (not represented) is provided to open and close the clamp.

In FIG. 18, the clamp is schematically represented. It can comprise a variable number of joints depending on its kinematic complexity. It could advantageously be made using jointed limbs according to the invention. It could also be a more complex gripper, possibly provided with several actuators, as for example and in a non-limiting way a robot hand, without departing from the scope of the invention.

This robot architecture enables the clamp to be displaced in all directions in translation of rotation. All the actuators are advantageously provided with angular position sensors, which enables these displacements and/or strains applied by the robot to be driven. By virtue of the invention, the structure is relatively light and its cost is reduced because all the inserts are mass produced.

Further, it advantageously has an increased lifetime enhanced thanks to the manufacture of inserts of hard material.

Figure 19:
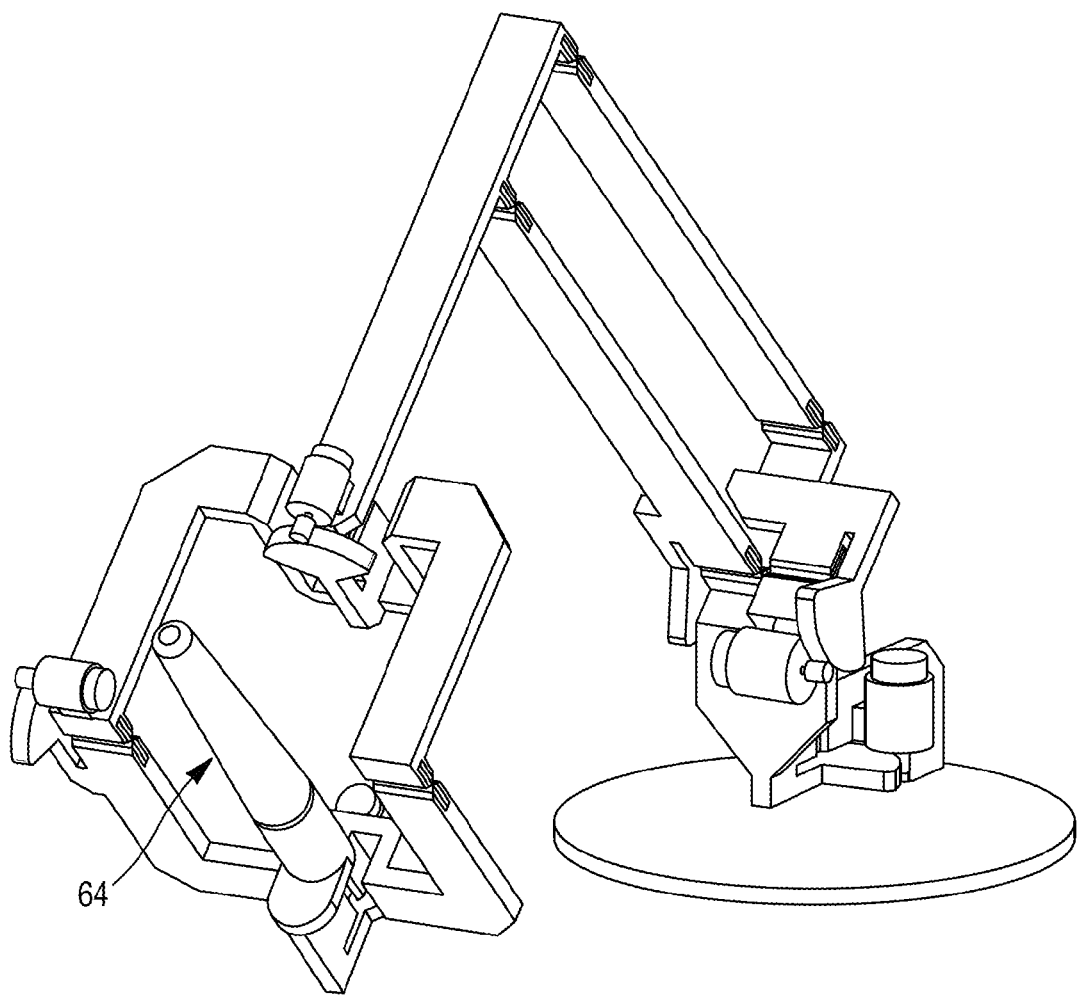
FIG. 19 is a perspective view of an exemplary embodiment of a haptic interface using jointed limbs according to the invention.

In FIG. 19, a haptic interface can for example be seen which is made using jointed limbs according to the invention. The structure is identical to that of the robot of FIG. 18, except for the clamp which has been replaced by a handle 64 allowing a manipulation by an operator. The references designating the other parts of this interface which are similar to that of the robot of FIG. 18 are not repeated in FIG. 19.

The structure described in FIGS. 18 and 19 is only given by way of example and is in no way limiting. Any other combination is contemplatable according to the needs.

The actuators and position sensors can thus be of any type, in particular those previously described. The reducers can also be of any type and non-necessarily capstan reducers. Of course, the jointed limbs can also be provided with position sensors, in particular those previously described. Besides, such structures can combine jointed limbs according to the invention and more conventional joints such as for example and non-exhaustively ball bearing or plain bearing joints, for example of bronze or PTFE, without departing from the scope of the invention.

The kinematic described in FIGS. 18 and 19 is only given by way of example and any other structure using jointed limbs according to any of the embodiments described in this document falls within the scope of the invention. In particular, the axes of the joint of the first and second members of the parallelogram 43 could not be aligned, the parallelogram 46 being in this case replaced by a mechanism with 5 bars well-known to those skilled in the art. In the same way, the wrist of the robot of FIG. 18 or of the haptic interface of FIG. 19 could be replaced by a parallel or series parallel mixed wrist, as for example and in a non-limiting way a spherical mechanism with 4 bars in series with a pivot connection.

The jointed limbs according to the present invention are particularly suitable for making small size mechanisms such as for example portable devices, such as a force feedback glove. An example of such a glove made with jointed limbs according to the invention is represented in FIG. 20.

Figure 20:
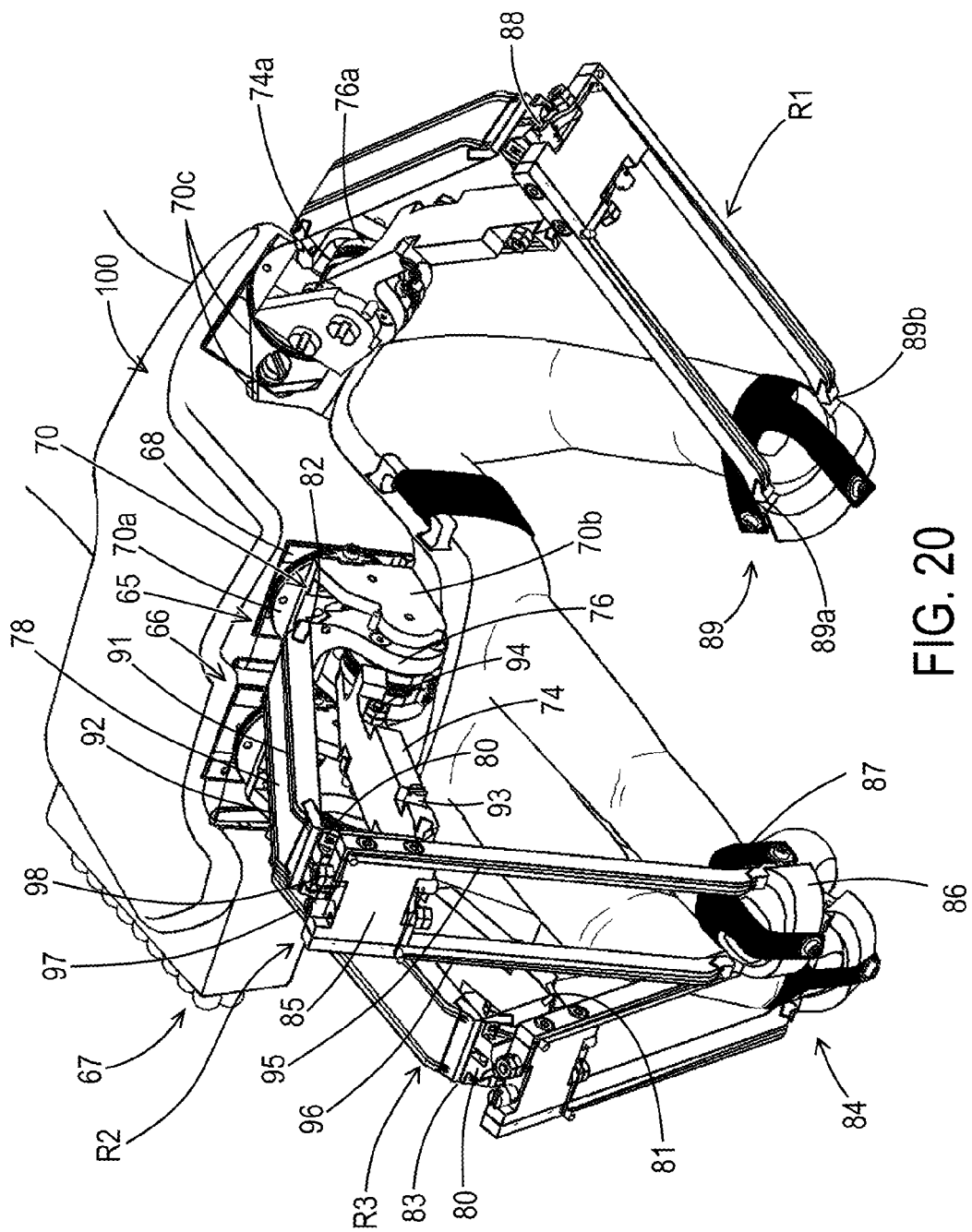
FIG. 20 is a perspective view of an exemplary force feedback glove implementing jointed limbs according to the present invention.

The glove of FIG. 20 comprises three force feedback robots R1, R2, R3 for interacting with the thumb, forefinger and middle finger respectively.

Since the three robots R1, R2, R3 are similar, only the robot R2 interacting with the forefinger will be described in detail.

The robot R2 comprises a carrier having three degrees of freedom formed by a pivot connection 65 in series with a parallelogram structure 66. In the example represented, these axes are actuated by off-centred motors the movements of which are transmitted to the glove by cables travelling in sheaths only the ends 67 of which are represented in FIG. 20. Alternatively, they could be actuated by on board motors. The motors are herein bidirectionally used, two sheaths are then required for each motorized joint. In the case where the motor(s) would not be used to drive the strains only in a single direction, for example to resist to strains for closing the hand, a single sheath will be necessary. Springs could then be for example provided to act in the other direction. Return pulleys can advantageously be placed inside the cowling 100 of the robot to deviate the cables and properly return them between the outlets of the sheaths and the pulleys to be actuated. Such return pulleys as well as means for properly providing them in space are well-known to those skilled in the art and will not be detailed herein. For the sake of clarity, the cowling is represented closed in FIG. 20 and hides the return pulleys.

In the example represented, the robot R2 comprises pivot connections conventionally made using plain bearings enabling both elements to be jointed to be rotated with respect to the other. This is here the pivot connection 65 between the base 68 of the robot and a shoulder 70 of the robot R2 comprising an actuating pulley 70a and a U part 70b being a support for the parallelogram 66, a pivot connection between the shoulder 70 and the arm 74 and a pivot connection between the shoulder 70 and a small connection rod 76 which drives the actuating connecting rod 78 of a forearm 80 best seen on the robot R3 of the middle finger. This guides are conventional and are not presented in greater details. Of course, all of these connections could be made with jointed limbs according to the present invention. The other connections of the parallelogram, that is the joint 81 between the arm 74 and the forearm 80, best seen on the robot R3, the joint 82 between the small connecting rod 76 and the connecting rod 78 and the joint 83 between the connecting rod 78 and the forearm 80, also best seen on the robot R3, are obtained using jointed limbs according to the present invention.

In this example, a same cable is used to contribute to making several connections and two cables 91, 92 only are used to make the three connections of the parallelogram which are associated with the jointed limbs according to the invention. The cable 91 is attached to a tensioner 93 provided on the arm 74, the tensioner being rotatably movable with respect to the same. It then travels along the segment of the arm 74 and then passes through the inserts of the arm 74 and a first end of the forearm 80 and then travels along the segment of the forearm 80. It then passes through the inserts provided at the other end of the forearm 80 and at a first end of the connecting rod 78 and then travels along the connecting rod. Finally, it passes through the inserts provided at the other end of the connecting rod 78 and on-small the connecting rod 76 and then travels along the small connecting rod and goes round a pin located on this connecting rod. It then comes back in the opposite direction to the tensioner 94 by passing just close to the outward path. The cable 92 follows a similar path starting from a tensioner 94 and then travelling along the parts of the parallelogram and through the inserts located at their ends and then coming back to the tensioner 94. The tensioners are provided to ensure tensioning of the cables 91, 92. For example, these are pierced axes which enable the cable to be tensioned by rotating them about their axis. They are then held in place using a nut and a locknut. Advantageously, a cable is located on an edge of the parts and the other one on the opposite edge so as to move the cables away as much as possible to best resist to the parasitic strains, as already described previously.

The robot R2 also comprises a wrist 84. On most robots, the wrists have three concurrent pivot connections. As seen in FIGS. 18 and 19, most of the time, the first pivot connection has its axis parallel to the main elongation direction of the forearm and it is provided in proximity to the robot end, the second one is perpendicular thereto and the third one is perpendicular to the first two ones in a reference configuration. In the example represented in FIG. 20, the chosen configuration is different. The first pivot connection 88 best seen on the robot R1 has an axis parallel to the main elongation direction of the forearm but it is here advantageously off centred in proximity to the parallelogram. The first movable segment 85 of the wrist can thus be advantageously recessed on a great length. This recess let the finger pass when the same is folded. The second pivot connection 89 has an axis advantageously perpendicular to the first one and it is provided at the end of the robot. It connects the segment 85 to a second movable segment 86 of the wrist intended to receive the finger trip. The robot base is advantageously placed with respect to the hand palm such that, for most users, this axis is parallel or nearly parallel to the axes of the interphalangeal connections. The size of the second movable segment of the wrist, and in particular the hollow depth receiving the finger tip, is also advantageously selected such that this axis passes through the medium plane of the phalanx of the finger tip. Under these conditions, the finger movements about an axis perpendicular to the first two ones are small and it is not necessary to add a third pivot connection. However, the hollow of the segment 86 receiving the fingertip advantageously has a cylinder shape ended by a sphere so as to accommodate slight parasitic movements. Of course, a third pivot connection could be added, perpendicular or not to the first two ones in a reference configuration, without departing from the scope of the invention. These two connections are made using jointed limbs according to the present invention. As for the second pivot connection of the robot wrist of FIG. 18, the pivot connection 89 is herein obtained using two jointed limbs making pivot connections 89a and 89b of collinear axes best seen on the robot R1. Once again, a same cable is used to contribute to making several connections. A cable 95 is attached to a tensioner 97 provided on the first segment 85 of the wrist, the tensioner 97 being rotatably movable with respect to the same. It then passes through the inserts of the segment 85 and of the forearm 80 and then goes round a pin provided on the forearm 80. It then passes back through another groove of the inserts of the forearm 80 and of the segment 85 and then travels along the segment 85 by bypassing a pin which enables it to be held above one of the edges of the recessed part of the segment 85. It then passes through inserts provided at the other end of the segment 85 in one of the edges of the recessed part of this segment and on the other segment 86 of the wrist. It then goes round a pin located on the front segment 86 before passing back through another groove of the inserts of the second segment 86 and the first edge of the recessed part of the segment 85. Finally, it travels along the segment 85 by bypassing a pin, advantageously the same as in the outward path, before coming back to the tensioner 97. The cable 96 follows a similar path starting from a tensioner 98 and then travelling along the parts of the wrist through the inserts located at their ends and then coming back to the tensioner 98. As previously in the example represented, the tensioners are pierced axes which enable the cable to be tensioned by rotating them about their axis. They are then held in place using a nut and a locknut. As previously also, a cable is advantageously located on an edge of the parts and the other one on the opposite edge so as to move the cables away as much as possible to best resist to the parasitic strains. The cable 95 passes in particular through one of the edges of the recessed part of the segment 85 and the cable 96 on the other edge of the recessed part of the segment 85.

In the example represented, the glove is also provided with flexible straps 87 provided at the end of each of the robots and enabling the finger tips to be held in contact with the segments 86. Thus, the user can displace the robots R1, R2, R3 the movements of which are measured by the coders of local or distant motors (not represented). This information can then be used for example to control an application in a virtual environment or a distant robot. The motors may also be controlled to give back a force feedback to the user as a function of the interactions in the virtual environment or contacts of the robot with its environment. This forces are transmitted to the fingers by the three robots R1, R2, R3.

In the example represented, only the pivot connections between the base 68 and the shoulder 70, respectively between the shoulder 70 and the arm 74 and between the shoulder 70 and the small connecting rod 76 are motorized, the other connections being passive. On the connection between the base 68 and the shoulder 70, the movements and forces from the distant motor are transmitted to the shoulder 70 through two filaments of a cable 70c represented for the sake of clarity on the robot R1 and travelling in the end sheaths 67 and on the return pulleys up to the pulley 70a. This cable also enables the displacement and forces imposed by the user to be transmitted up to the force feedback motor. Pulleys 74a and 76a having a role similar to that of the pulley 70a are attached to the arm 74 and to the small connecting rod 76 and enable displacements and forces to be transmitted between the segments displaced by the user and the force feedback motors through hidden cables in FIG. 20. Further return pulleys are advantageously used on the base of the robot and the U part 70b of the shoulder to bring back the 4 cable filaments actuating the pulleys 74a and 76a in proximity to the axis of the joint 65, so as to uncouple the movements of all the three motorized axes. This arrangement is known to those skilled in the art and will be not detailed herein. Of course, the wrist connections could also be actuated without departing from the scope of the invention.

As previously explained, the robots R1, R2, R3 are advantageously placed in proximity to the fingers, which enables wrists with only two degrees of freedom to be made without being detrimental to the comfort of the device.

In the example represented, the glove is advantageously attached to the hand palm thanks to straps.

Alternatively, the glove could also be mounted on a robot or a haptic interface, for example in place of the clamp on the robot of FIG. 18 or the handle of the haptic interface of FIG. 19. In this case, the glove could be carried by the robot and could then be detached from the hand palm. The movements of the user hand would then be advantageously measured thanks to a "motion capture" type system, a device which is well-known to those skilled in the art, in order to regulate the robot movements such that it permanently maintains the glove in proximity to the user hand.

The glove of FIG. 20 is given by way of example. A glove with a different number of robots could also be made, for example two robots to interact with the thumb and the forefinger or five robots to interact with all the fingers of the hand. In the same way, a different architecture could be used for each finger, comprising for example six independent degrees of freedom for some robot or for all the robots or otherwise only four of them for some robots or for all the robots. The parallelogram could also be replaced by a more complex coupled structure following more closely the movements of human fingers. With this type of coupled structures, the number of motors could be reduced, to typically one or two per finger. They could also be on board on the hand palm. They further could be replaced on all or part of the axes of the motors by brakes or combinations of motors and brakes. Of course, other types of joint cables could also be used, with strips of woven or non-woven fibres, inserts and tensioners, in particular those previously described, or even segments having different shapes, without departing from the scope of the invention. Different means could also be used to attach the robot to the hand palm, for example and in an non-limiting way a passive glove on which the base of the force feedback glove could be attached. In the same way, different means could be used to hold the finger tips in contact with the ends of the robots, for example and in a non-limiting way gauged dice receiving the finger tips and fixable on the segments 86.

Touch actuators, for example piezoelectric or electromagnetic actuators could also be integrated to the handle of the haptic interfaces such as those of FIG. 19 or the ends of the robots of the glove of FIG. 20, so as to increase the force feedback realism.

These examples are of course non-limiting. Connections of this type could also be used non-exhaustively on the following devices:
- robots, cobots and haptic interfaces with a series architecture having three or six degrees of freedom being actuated, using for example a pivot and parallelogram carrier,
- robots, cobots and haptic interfaces with a parallel architecture having three or six degrees of freedom being actuated, using for example three branches each with two or three motors, robots, cobots and interfaces with a mixed architecture having six degrees of freedom being actuated, using for example two branches made with a pivot and a parallelogram and a series axis, exoskeletons of legs, trunk, arms and hands, series robots, parallel robots, humanoid robots, in particular their legs, arms and hands.

The jointed limb according to the invention has a very simple compact joint comprising few parts. The joint is further accurate, since it has substantially no parasitic movement. Further, the implementation of the fibrous material to connect both segments enables very transparent joints to be made exerting nearly no resistance to the movement imposed by motors or a user. The jointed limb can advantageously be very solid and have little wear.

Further, the jointed limbs according to the present invention enable low cost poly-jointed devices to be made, and generally having a restricted weight with respect to the devices of the state of the art.

By comparison, no joint of the state of the art simultaneously offers all the advantages. Indeed, the ball bearing or plain bearing joints are accurate and transparent but they are bulky and complex. The bioinspired joints are complex, they generally do not make simple movements and are brittle. The flexible joints with distributed flexibility are simple to make but they have restrictive angular displacements (thus they are bulky for great displacements), are not solid, have a moderate yield and are not transparent. The flexible joints with a local flexibility, whether they use thin necks, added rods, springs or flexible materials, are simple and compact but suffer from the same defects as those with a distributed flexibility. The thinned hinges are simple but not very solid, therefore they are generally very wide.

They also generally poorly resist to common parasitic strains. In the case where several layers are used, a high free length is necessary and the connection is not accurate. Finally, the composite connections with two components can be simple, compact and very transparent. However, on a complex system as a robot, their implementation is expensive. Besides, on a light system as a robot, they can be worn rapidly.

The invention claimed is:

1. A jointed limb comprising:
at least first and second rigid segments and
a joint providing rotation of the first and second segments with respect to each other about an axis of rotation, said joint comprising at least one elongated element formed by cables and/or strips of woven or non-woven fibres, the elongated element extending, in a reference configuration, along a direction perpendicular to the axis of rotation, and wherein a medium plane of the elongated element passes at least partially through, or in proximity to, the axis of rotation, and
wherein each of the segments comprises a body and an end element provided at an end of said body, both end elements being held facing each other by said joint, said end elements comprising tapered profiles having vertices facing each other, each of said end elements being made prior to being secured to the corresponding body.

2. The jointed limb according to claim 1, wherein the vertices have a rounded profile.

3. The jointed limb according to claim 1, wherein the elongated element extends, in a reference configuration, along a direction perpendicular to the axis of rotation between the first and second segments, said strip comprising edges separated by a distance in the direction of the axis of rotation close to the dimensions of the end elements in this direction.

4. The jointed limb according to claim 1, wherein the elongated element extends, in a reference configuration, along a direction perpendicular to the axis of the joint between the first and second segments, said strips comprising at least a first and a second strip, these said first and second strips being provided at the external ends of the joint in the direction of the axis of rotation, the external edges of said first and second external strips being separated by a distance in the direction of the axis of rotation close to the dimensions of the end elements in this direction.

5. The jointed limb according to claim 1, wherein the elongated elements are inserted in each end element at a plane of each of said end elements passing through their vertex, said plane comprising, in a reference configuration, the axis of rotation.

6. The jointed limb according to claim 1, wherein the bodies comprise two parts between which the end elements are held.

7. The jointed limb according to claim 1, wherein the bodies are moulded on the end elements.

8. The jointed limb according to claim 1, wherein the jointed limb comprises means preventing the elongated elements from being displaced along the axis of rotation.

9. The jointed limb according to claim 8, wherein the means preventing the elongated elements from being displaced along the axis of rotation comprise grooves extending perpendicular to the axis of rotation, said grooves being located inside the end elements made in two parts and/or being located on at least one end face and/or being formed in the tip of at least one end element.

10. The jointed limb according to claim 8, wherein the means preventing the elongated elements from being displaced along the axis of rotation comprise a pair of flanges carried by one of the segments and providing a space the transverse dimension of which is able to receive the proximal part of the other segment and prevent it from being displaced along the axis of rotation.

11. The jointed limb according to claim 1, comprising means for exerting a tensile strain on the elongated elements.

12. The jointed limb according to claim 1, wherein the jointed limb comprises at least a first and a second elongated element, the first elongated element being located in proximity to the first side edges of the end elements and the second elongated element being located in proximity to the second opposite side edges.

13. The jointed limb according to claim 1, wherein the end elements are of hard material such as steel.

14. The jointed limb according to claim 1, wherein the bodies are of light material, selected from the group consisting of aluminium and a plastic material.

15. The jointed limb according to claim 1, comprising at least one measuring element a part of which is attached to the first rigid segment and another part of which is attached to the second rigid segment.

16. A jointed mechanism comprising at least two jointed limbs according to claim 1 and at least one actuating device for displacing a segment with respect to the other.

17. A robot or haptic interface comprised at least one jointed limb according to claim 1.

18. A method for manufacturing a jointed limb according to claim 1, comprising the following steps:
manufacturing first and second rigid segments,
manufacturing two end elements, placing the end elements at a respective end of each of the first and second rigid segments,
placing the at least one elongated element into and/or around the end elements,
contacting the end elements through their vertex,
tensioning the at least one elongated element, and
assembling with the body.

19. A jointed limb comprising:
at least first and second rigid segments; and
a joint providing rotation of the first and second segments with respect to each other about an axis of rotation, said joint comprising at least two elongated elements formed by cables and/or strips of woven or non-woven fibres, the elongated elements extending, in a reference configuration, along a direction perpendicular to the axis of rotation, and
wherein each of the segments comprises a body and an end element provided at an end of said body, both end elements being held facing each other by said joint, said end elements comprising tapered profiles having vertices facing each other, each of said end elements being made prior to being secured to the corresponding body, and
wherein the elongated elements run on external faces of the end elements, said faces defining the tapered profile and meeting at the vertex, said elongated elements intersecting at the axis of rotation.

20. A jointed limb comprising:
at least first and second rigid segments; and
a joint providing rotation of the first and second segments with respect to each other about an axis of rotation, said joint comprising at least two elongated elements formed by cables and/or strips of woven or non-woven fibres, the elongated elements extending, in a reference configuration, along a direction perpendicular to the axis of rotation, and
wherein each of the segments comprises a body and an end element provided at an end of said body, both end elements being held facing each other by said joint, said end elements comprising tapered profiles having vertices facing each other, each of said end elements being made prior to being secured to the corresponding body, and
wherein first elongated elements run on external faces of the end elements, said faces defining the tapered profile and meeting at the vertex, said first elongated elements intersecting at the axis of rotation, and wherein second elongated elements pass through the end elements at a plane of said end elements passing through their vertex, said plane intersecting, in a reference configuration, the axis of rotation.

* * * * *

UNITED STATES PATENT AND TRADEMARK OFFICE
CERTIFICATE OF CORRECTION

PATENT NO.      : 9,636,828 B2                          Page 1 of 1
APPLICATION NO. : 14/367471
DATED           : May 2, 2017
INVENTOR(S)     : Florian Gosselin et al.

It is certified that error appears in the above-identified patent and that said Letters Patent is hereby corrected as shown below:

In the Specification

Column 13, Line 41, "tilted faces of each insert 601.1," should read --tilted faces of each insert 610.1,--

Signed and Sealed this
Third Day of October, 2017

Joseph Matal
*Performing the Functions and Duties of the*
*Under Secretary of Commerce for Intellectual Property and*
*Director of the United States Patent and Trademark Office*